United States Patent
Cheng

(10) Patent No.: US 8,990,067 B2
(45) Date of Patent: Mar. 24, 2015

(54) MACHINE TRANSLATION INTO A TARGET LANGUAGE BY INTERACTIVELY AND AUTOMATICALLY FORMALIZING NON-FORMAL SOURCE LANGUAGE INTO FORMAL SOURCE LANGUAGE

(76) Inventor: Guangyuan Cheng, Shanghai (CN)

( * ) Notice: Subject to any disclaimer, the term of this patent is extended or adjusted under 35 U.S.C. 154(b) by 329 days.

(21) Appl. No.: 13/520,146

(22) PCT Filed: Dec. 28, 2010

(86) PCT No.: PCT/CN2010/080353
§ 371 (c)(1),
(2), (4) Date: Jun. 29, 2012

(87) PCT Pub. No.: WO2011/079769
PCT Pub. Date: Jul. 7, 2011

(65) Prior Publication Data
US 2012/0278062 A1 Nov. 1, 2012

(30) Foreign Application Priority Data
Dec. 31, 2009 (CN) .......................... 2009 1 0247943

(51) Int. Cl.
*G06F 17/28* (2006.01)
(52) U.S. Cl.
CPC .................................. *G06F 17/2872* (2013.01)
USPC ....................................... 704/2; 704/4; 704/8
(58) Field of Classification Search
CPC . G06F 17/28; G06F 17/2818; G06F 17/2863; G06F 17/2872
USPC ...................................... 704/2, 3, 4, 5, 277, 8
See application file for complete search history.

(56) References Cited

U.S. PATENT DOCUMENTS

| | | | | |
|---|---|---|---|---|
| 4,864,503 | A | * | 9/1989 | Tolin .................................. 704/2 |
| 5,386,556 | A | * | 1/1995 | Hedin et al. ..................... 706/11 |

(Continued)

FOREIGN PATENT DOCUMENTS

| | | |
|---|---|---|
| CN | 98110793.1 | 10/1999 |
| CN | 1263315 | * 8/2000 |

(Continued)

OTHER PUBLICATIONS

Guangyuan Cheng. Meaning Formalization: A Theory about Natural Language Understanding, Automatic Translation, Knowledge Representation. A symposium on natural language understanding of the Chinese Association on Artificial Intelligence (CAAI), (1998).

*Primary Examiner* — Martin Lerner

(57) ABSTRACT

A machine translation method and system comprises the steps of (a) formalizing a non-formal source language in an interactive or automatic way and (b) transforming the formal source language into a formal or non-formal target language in an automatic way. It eliminates the language barrier between person and person and the language barrier between person and computer: A user translates his/her non-formal native language correctly and without lexical ambiguity into any non-formal foreign language which he/she knows nothing about; a user and a computer exchange information in his/her non-formal native language correctly and without lexical ambiguity. It can be used in network terminal equipment, Internet knowledge bases, knowledge reasoning search engines, expert systems and automatic programming. That formalization of a source language is the common foundation for transformation into various target languages makes it especially suitable for multilingual machine translation.

14 Claims, 11 Drawing Sheets

(56) References Cited

U.S. PATENT DOCUMENTS

| | | | |
|---|---|---|---|
| 5,426,583 A * | 6/1995 | Uribe-Echebarria Diaz De Mendibil | 704/2 |
| 5,475,586 A * | 12/1995 | Sata et al. | 704/2 |
| 5,587,902 A * | 12/1996 | Kugimiya | 704/2 |
| 5,751,957 A * | 5/1998 | Hiroya et al. | 704/2 |
| 5,826,219 A * | 10/1998 | Kutsumi | 704/4 |
| 7,672,829 B2 * | 3/2010 | Ishikura | 704/2 |
| 8,311,799 B2 * | 11/2012 | Liu | 704/4 |
| 2002/0173946 A1 * | 11/2002 | Christy | 704/2 |
| 2004/0181390 A1 * | 9/2004 | Manson | 704/2 |
| 2005/0010421 A1 * | 1/2005 | Watanabe et al. | 704/277 |
| 2005/0273315 A1 * | 12/2005 | Laitila | 704/9 |
| 2006/0190436 A1 * | 8/2006 | Richardson et al. | 707/3 |
| 2008/0086300 A1 * | 4/2008 | Anismovich et al. | 704/9 |
| 2009/0182549 A1 * | 7/2009 | Anisimovich et al. | 704/4 |
| 2009/0254334 A1 * | 10/2009 | Miyahira et al. | 704/7 |

FOREIGN PATENT DOCUMENTS

| | | |
|---|---|---|
| CN | 1319836 | 10/2001 |
| CN | 101430680 | 1/2011 |

* cited by examiner

MACHINE TRANSLATION INTO A TARGET LANGUAGE BY INTERACTIVELY AND AUTOMATICALLY FORMALIZING NON-FORMAL SOURCE LANGUAGE INTO FORMAL SOURCE LANGUAGE

CROSS REFERENCE OF RELATED APPLICATION

This is a U.S. National Stage under 35 USC 371 of the International Application PCT/CN2010/080353, filed Dec. 28, 2010.

BACKGROUND OF THE PRESENT INVENTION

1. Field of Invention

The present invention relates to a method of machine translation and a system of machine translation, and more particularly to a method of machine translation and a system of machine translation based on formalization processing.

2. Description of Related Arts

The inventor began his research on artificial intelligence (computer simulation of human intelligence) at the end of the 1970s. The core of artificial intelligence is knowledge processing (acquisition and use of knowledge); the basis of knowledge processing is knowledge representation (formal representation of commonsense knowledge and professional knowledge). A knowledge representation method for formally representing commonsense knowledge and professional knowledge (especially commonsense knowledge) universally and fully is a major problem that the artificial intelligence world has been eager to solve for a long time.

Natural language understanding technology aimed at natural language man-machine interface (natural language communication between a user and a computer) is an important technology of artificial intelligence. The basis of natural language communication between a user and a computer is formalizing a non-formal natural language. A method for formalizing a non-formal natural language is a major problem that the artificial intelligence world has been eager to solve for a long time.

Machine translation technology is an important technology of artificial intelligence. A method of machine translation which makes a substantial breakthrough in translation quality is a major problem that the artificial intelligence world has been eager to solve for a long time. The existing machine translation mainly includes the following two categories: machine translation based on direct transformation from a source language into a target language and machine translation based on an intermediate language. A machine translation system based on direct transformation from a source language into a target language performs in turn transformation at the word level, transformation at the lexical level, transformation at the syntactic level, transformation at the semantic level, and transformation rules apply only to a specific pair of languages. A machine translation system based on an intermediate language maps a source language onto an assumed intermediate expression first, and then maps the intermediate expression onto a target language. So far, there has been no universal intermediate language. No existing method of machine translation makes a substantial breakthrough in translation quality. The inventor holds that formalizing a non-formal source language is the basis of high-quality machine translation and that no existing method of machine translation makes a substantial breakthrough in translation quality just because no existing method of machine translation formalizes a non-formal source language.

In 1988, the inventor published a paper entitled *Meaning Formalization: A Theory about Natural Language Understanding, Automatic Translation, Knowledge Representation* at a symposium on natural language understanding of the Chinese Association on Artificial Intelligence (CAAI).

In 1989-1991, the inventor as a visiting scholar of the Intelligence Technologies and Systems Laboratory of Tsinghua University, cooperating with a computer worker and using the machine translation method described in the above paper, developed an experimental Japanese-Chinese machine translation system, which translated correctly a number of long sentences of complicated structure.

In 1998, the inventor submitted an application to the Patent Office of China for a patent on the invention "the Meaning Formalization Method of Automatic Translation" (application number: 98110793.1). The invention was a development of the machine translation method described in the above paper. It had the following main technical features: 1 Translation modes are stored in a computer storage; a combination mode of a source language and a number of corresponding transformation modes for transforming the source language into a number of target languages constitute a translation mode; a combination mode contains grammatical attribute marks and semantic attribute marks of the component segments and contains a grammatical attribute mark and a semantic attribute mark of the composed segment; a basic combination rule, i.e. composing level by level according to combination modes, and a basic transformation rule, i.e. transforming level by level according to transformation modes, are stored in a computer storage. 2 In the process of composing level by level according to combination modes, a computer processor finds all the combination modes which can be used in the computer storage and chooses one of the combination modes in the choice order that a mode with a larger total number of use is prior to a mode with a smaller total number of use; if the computer processor finds out that there does not exist a combination mode which can be used in the computer storage, the processor performs backtracking. 3 If a combination mode contains marks used as signs of semantic relations between component segments and contains marks used as signs of semantic relations between component segments and a formed segment, combination modes and combination rules can be used in natural language understanding. The invention (1998) was a method of machine translation for translating a non-formal source language into a non-formal target language in an automatic way. An obvious limitation of the invention was that the translation could not be entirely correct. The only application of the invention was information exchange in a certain degree between people speaking respective native languages.

In 1999, the inventor submitted an application to the Patent Office of China for a patent on the invention "the Meaning Formalization Method of Computer-aided Translanguage Information Exchange" (application number: 99113471.0). It had the following main technical features: 1 A lexicon in which synonyms of a number of languages correspond to each other, combination marks and relation marks are stored in a computer storage; a user expresses information on a display device of a computer with words of a certain language, combination marks and relation marks, and then the computer transforms the displayed words of the language into corresponding words of another language. 2 Words of the same form and different meanings are distinguished from each other by attached words of similar meanings. 3 Key component marks (The object of the key component is identical to the object of the formed language segment). 4 A list of relation marks in which relation marks of a number of languages correspond to each other is stored in a computer storage; the computer transforms displayed relation marks of a language into corresponding relation marks of another language. 5 After a user inputs a word, a computer displays a number of words of similar meanings to be chosen by the user.

A knowledge representation method is a method for describing knowledge as a data structure that a computer is able to deal with. The following are common knowledge representation methods: predicate logic representation, production representation, semantic network representation, frame representation, object-oriented representation, state space representation, etc. The invention (1999) was in essence 5 a knowledge representation method. It is natural for the invention or any other knowledge representation method to contain a lexicon in which synonyms of a number of languages correspond to each other. It should be pointed out that the invention did not accord with natural languages because the lexicon of the invention was limited to 10 notional words and relation marks displaced function words (vocabulary of any natural language comprises notional words and function words).

SUMMARY OF THE PRESENT INVENTION

The present invention has been achieved in view of the aforementioned problems possessed by the prior art, and the object of the present invention is to provide a novel and improved machine translation method and system which makes a substantial breakthrough in translation quality.

To achieve the above object, according to a first aspect of the present invention, there is provided a method of machine translation which has the following technical features: the process of translation is first formalizing a non-formal source language and then transforming the formal source language into a target language; the method has two ways of formalizing a non-formal source language, i.e. an interactive way and an automatic way; the method has two target languages, i.e. a formal target language and a non-formal target language; the process of formalizing a non-formal source language is first identifying one by one the fixed language segments of an initial language segment of a non-formal source language and tagging the fixed language segments with meaning marks until the last fixed language segment and then composing level by level the non-fixed language segments of the initial language segment and tagging the non-fixed language segments with key component marks and relation marks until the non-fixed language segment constituted by the whole initial language segment; the process of transforming a formal source language into a formal target language is transforming in an automatic way the fixed language segments of the source language into language segments of the target language according to fixed language segment transformation rules; the process of transforming a formal source language into a non-formal target language is first transforming in an automatic way the fixed language segments of the source language into language segments of the target language according to fixed language segment transformation rules and then transforming level by level in an automatic way the non-fixed language segments of the source language into language segments of the target language according to non-fixed language segment transformation rules.

According to a second aspect of the present invention, there is provided a method of machine translation, wherein: the process of formalizing a non-formal source language includes a pre-processing by means of substitution marks, i.e. separating an initial language segment into a number of sub-segments by means of substitution marks in advance, and then formalizing the sub-segments respectively.

According to a third aspect of the present invention, there is provided a method of machine translation, wherein: a fixed language segment mode in a computer storage contains a fixed language segment and its meaning mark (fixed language segments of the same form and different meanings bearing meaning marks); in the process of identifying and tagging fixed language segments in an interactive way, a computer processor judges in turn whether there exists in the computer storage at least one fixed language segment beginning with the one writing unit at the forefront, whether there exists in the computer storage at least one fixed language segment beginning with the two writing units at the forefront, whether there exists in the computer storage at least one fixed language segment beginning with the three writing units at the forefront, and so on; if there exists in the computer storage at least one fixed language segment beginning with the n (a natural number, and the same below) writing unit(s) at the forefront and there does not exist in the computer storage at least one fixed language segment beginning with the n+1 writing units at the forefront, the computer processor identifies the n writing unit(s) at the forefront as a fixed language segment and tags it with a meaning mark according to a fixed language segment mode, and after that a user confirms or revises the mark; if the computer processor finds out that there does not exist in the computer storage at least one fixed language segment beginning with the one writing unit at the forefront of the remaining language segment, a user identifies the fixed language segment beginning with the one writing unit at the forefront of the remaining language segment and tags it with a meaning mark; the process is repeated until the last fixed language segment.

According to a fourth aspect of the present invention, there is provided a method of machine translation, wherein: a fixed language segment mode in a computer storage contains a fixed language segment and its meaning mark (fixed language segments of the same form and different meanings bearing meaning marks) and contains a grammatical attribute mark and a semantic attribute mark; in the process of identifying and tagging fixed language segments in an automatic way, a computer processor judges in turn whether there exists in the computer storage at least one fixed language segment beginning with the one writing unit at the forefront, whether there exists in the computer storage at least one fixed language segment beginning with the two writing units at the forefront, whether there exists in the computer storage at least one fixed language segment beginning with the three writing units at the forefront, and so on; if there exists in the computer storage at least one fixed language segment beginning with the n (a natural number, and the same below) writing unit(s) at the forefront and there does not exist in the computer storage at least one fixed language segment beginning with the n+1 writing units at the forefront, the computer processor identifies the n writing unit(s) at the forefront as a fixed language segment, and then finds all the fixed language segment modes which can be used in the computer storage, chooses one of the fixed language segment modes in the choice order that a mode with a larger total number of use is prior to a mode with a smaller total number of use, and tags the fixed language segment with a meaning mark, a grammatical attribute mark and a semantic attribute mark according to the fixed language segment mode; if the computer processor finds out that there does not exist in the computer storage at least one fixed language segment beginning with the one writing unit at the forefront of the remaining language segment, the processor performs backtracking; the process is repeated until the last fixed language segment.

According to a fifth aspect of the present invention, there is provided a method of machine translation, wherein: a non-fixed language segment mode in a computer storage contains grammatical attribute marks and semantic attribute marks of the component segments and contains a combination mark, a key component mark, a relation mark, a grammatical attribute mark and a semantic attribute mark of the composed segment; in the process of composing and tagging non-fixed language segments in an automatic way, a computer processor finds all the non-fixed language segment modes which can be used in the computer storage, chooses one of the non-fixed language segment modes in the choice order that a mode with a larger total number of use is prior to a mode with a smaller total number of use, composes a non-fixed language segment and tags it with a key component mark, a relation mark, a grammatical attribute mark and a semantic attribute mark according to the non-fixed language segment mode; if the computer processor finds out that there does not exist a non-fixed language segment mode which can be used in the computer storage, the processor performs backtracking; the process is repeated until the non-fixed language segment constituted by the whole initial language segment.

According to a sixth aspect of the present invention, there is provided a method of machine translation, wherein: after a user clicks on a meaning mark, a screen displays the meaning represented by this meaning mark, and, after a user clicks on a relation mark, a screen displays the relation represented by this relation mark.

According to a seventh aspect of the present invention, there is provided a method of machine translation, wherein: a non-fixed language segment transformation rule is a rule which forms a non-fixed language segment of the target language with the translations of the components of the non-fixed language segment of a source language and a relation word of a target language according to the key component mark and the relation mark or relation word of the non-fixed language segment of a source language; a computer processor searches a list of non-fixed language segment transformation rules for a matching non-fixed language segment transformation rule, transforms a non-fixed language segment of the source language into a non-fixed language segment of the target language according to the matching non-fixed language segment transformation rule, repeating the step recursively until all the non-fixed language segments are transformed level by level, in which process, concerning the current non-fixed language segment of the source language, first, all the components of the current non-fixed language segment are transformed into the target language respectively, and then, the current non-fixed language segment is transformed into the target language according to the matching non-fixed language segment transformation rule, the result of the transformation of the current non-fixed language segment being returned to be used by the non-fixed language segment at the higher level, until the non-fixed language segment as the initial data is transformed into the target language.

According to an eighth aspect of the present invention, there is provided a system of machine translation which has the following technical features: the system comprises a module for formalizing a non-formal source language and a module for transforming a formal source language into a target language which is connected to the module for formalizing a non-formal source language before it; a module for formalizing a non-formal source language has two ways of formalizing a non-formal source language, i.e. an interactive way and an automatic way; a module for transforming a formal source language into a target language has two target languages, i.e. a formal target language and a non-formal target language; in a module for formalizing a non-formal source language, the process of formalizing a non-formal source language is first identifying one by one the fixed language segments of an initial language segment of a non-formal source language and tagging the fixed language segments with meaning marks until the last fixed language segment and then composing level by level the non-fixed language segments of the initial language segment and tagging the non-fixed language segments with key component marks and relation marks until the non-fixed language segment constituted by the whole initial language segment; in a module for transforming a formal source language into a target language, the process of transforming a formal source language into a formal target language is transforming in an automatic way the fixed language segments of the source language into language segments of the target language according to fixed language segment transformation rules; in a module for transforming a formal source language into a target language, the process of transforming a formal source language into a non-formal target language is first transforming in an automatic way the fixed language segments of the source language into language segments of the target language according to fixed language segment transformation rules and then transforming level by level in an automatic way the non-fixed language segments of the source language into language segments of the target language according to non-fixed language segment transformation rules.

According to a ninth aspect of the present invention, there is provided a system of machine translation, wherein: the system includes a substitution module for pre-processing by means of substitution marks which is connected to a module for formalizing a non-formal source language after it, i.e. separating an initial language segment into a number of sub-segments by means of substitution marks in advance, and then formalizing the sub-segments respectively.

According to a tenth aspect of the present invention, there is provided a system of machine translation, wherein: a fixed language segment mode of a module for formalizing a non-formal source language contains a fixed language segment and its meaning mark (fixed language segments of the same form and different meanings bearing meaning marks); in the process of identifying and tagging fixed language segments in an interactive way, a computer processor judges in turn whether there exists in the computer storage at least one fixed language segment beginning with the one writing unit at the forefront, whether there exists in the computer storage at least one fixed language segment beginning with the two writing units at the forefront, whether there exists in the computer storage at least one fixed language segment beginning with the three writing units at the forefront, and so on; if there exists in the computer storage at least one fixed language segment beginning with the n (a natural number, and the same below) writing unit(s) at the forefront and there does not exist in the computer storage at least one fixed language segment beginning with the n+1 writing units at the forefront, the computer processor identifies the n writing unit(s) at the forefront as a fixed language segment and tags it with a meaning mark according to a fixed language segment mode, and after that a user confirms or revises the mark; if the computer processor finds out that there does not exist in the computer storage at least one fixed language segment beginning with the one writing unit at the forefront of the remaining language segment, a user identifies the fixed language segment beginning with the one writing unit at the forefront of the remaining language segment and tags it with a meaning mark; the process is repeated until the last fixed language segment. According to an eleventh aspect of the present invention, there is provided a system of machine translation, wherein: a fixed language segment mode of a module for formalizing a non-formal source language contains a fixed language segment and its meaning mark (fixed language segments of the same form and different meanings bearing meaning marks) and contains a grammatical attribute mark and a semantic attribute mark; in the process of identifying and tagging fixed language segments in an automatic way, the computer processor judges in turn whether there exists in the computer storage at least one fixed language segment beginning with the one writing unit at the forefront, whether there exists in the computer storage at least one fixed language segment beginning with the two writing units at the forefront, whether there exists in the computer storage at least one fixed language segment beginning with the three writing units at the forefront, and so on; if there exists in the computer storage at least one fixed language segment beginning with the n (a natural number, and the same below) writing unit(s) at the forefront and there does not exist in the computer storage at least one fixed language segment beginning with the n+1 writing units at the forefront, the computer processor identifies the n writing unit(s) at the forefront as a fixed language segment, and then finds all the fixed language segment modes which can be used in the computer storage, chooses one of the fixed language segment modes in the choice order that a mode with a larger total number of use is prior to a mode with a smaller total number of use, and tags the fixed language segment with a meaning mark, a grammatical attribute mark and a semantic attribute mark according to the fixed language segment mode; if the computer processor finds out that there does not exist in the computer storage at least one fixed language segment beginning with the one writing unit at the forefront of the remaining language segment, the processor performs backtracking; the process is repeated until the last fixed language segment. According to a twelfth aspect of the present invention, there is provided a system of machine translation, wherein: a non-fixed language segment mode of a module for formalizing a non-formal source language contains grammatical attribute marks and semantic attribute marks of the component segments and contains a combination mark, a key component mark, a relation mark, a grammatical attribute mark and a semantic attribute mark of the composed segment; in the process of composing and tagging non-fixed language segments in an automatic way, the computer processor finds all the non-fixed language segment modes which can be used in the computer storage, chooses one of the non-fixed language segment modes in the choice order that a mode with a larger total number of use is prior to a mode with a smaller total number of use, composes a non-fixed language segment and tags it with a key component mark, a relation mark, a grammatical attribute mark and a semantic attribute mark according to the non-fixed language segment mode; if the computer processor finds out that there does not exist a non-fixed language segment mode which can be used in the computer storage, the processor performs backtracking; the process is repeated until the non-fixed language segment constituted by the whole initial language segment.

According to a thirteenth aspect of the present invention, there is provided a system of machine translation, wherein: after a user clicks on a meaning mark, a screen displays the meaning represented by this meaning mark, and, after a user clicks on a relation mark, a screen displays the relation represented by this relation mark.

According to a fourteenth aspect of the present invention, there is provided a system of machine translation, wherein: a non-fixed language segment transformation rule of a module for transforming a formal source language into a target language is a rule which forms a non-fixed language segment of the target language with the translations of the components of a non-fixed language segment of a source language and a relation word of a target language according to the key component mark and the relation mark or relation word of the non-fixed language segment of the source language; a computer processor searches a list of non-fixed language segment transformation rules for a matching non-fixed language segment transformation rule, transforms a non-fixed language segment of a source language into a non-fixed language segment of a target language according to the matching non-fixed language segment transformation rule, repeating the step recursively until all the non-fixed language segments are transformed level by level, in which process, concerning a current non-fixed language segment of a source language, first, all the components of the current non-fixed language segment are transformed into a target language respectively, and then, the current non-fixed language segment is transformed into the target language according to the matching non-fixed language segment transformation rule, the result of the transformation of the current non-fixed language segment being returned to be used by the non-fixed language segment at the higher level, until the non-fixed language segment as the initial data is transformed into a target language.

The present invention as a whole is the organic combination of the technical features: A non-formal source language can be formalized either in an interactive way or in an automatic way; a formal source language can be transformed in an automatic way either into a formal target language or into a non-formal target language. The present invention has technical effects unexpected according to existing technologies: A user translates his/her non-formal native language entirely correctly and without any lexical ambiguity into any non-formal foreign language which he/she knows nothing about, so the present invention completely eliminates the language barrier between person and person; a user and a computer exchange information in his/her non-formal native language entirely correctly and without any lexical ambiguity, so the present invention completely eliminates the language barrier between person and computer. In addition to being used in network terminal equipment, the present invention has applications unexpected according to existing technologies: It can be used in Internet knowledge bases, knowledge reasoning search engines, expert systems and automatic programming. The present invention represents the new direction of development of technology. (Regarding to the application of the present invention, see The application of the machine translation from a non-formal source language into a formal target language and The application of the machine translation from a non-formal source language into a non-formal target language of the PCT document.)

For a long time, it has been generally accepted in the artificial intelligence world that knowledge representation, natural language understanding and machine translation are three research fields independent of each other. At the time when the inventor finished "the Meaning Formalization Method of Automatic Translation" (1998) and at the time when the inventor finished "the Meaning Formalization Method of Computer-aided Translanguage Information Exchange" (1999), the inventor believed that machine translation and knowledge representation are two research fields independent of each other ("the Meaning Formalization Method of Automatic Translation" as a machine translation method while "the Meaning Formalization Method of Automatic Translation" as a knowledge representation method). Later, after long-term research, the inventor broke through the technology stereotype and, on the basis of the above two inventions, finished the present invention (2009), which is a machine translation method of an entirely new concept. A user translates his/her non-formal native language entirely correctly and without any lexical ambiguity into any non-formal foreign language which he/she knows nothing about; A non-formal source language is translated into a formal target language, which is a knowledge representation method for formally representing commonsense knowledge and professional knowledge (especially commonsense knowledge) universally and fully; the method of formalizing a non-formal source language can be used in natural language understanding technology aimed at natural language man-machine interface. So, the present invention totally solves the three major problems that the artificial intelligence world has been eager to solve for a long time: a method of machine translation which makes a substantial breakthrough in translation quality; a knowledge representation method for formally representing commonsense knowledge and professional knowledge (especially commonsense knowledge) universally and fully; a method for formalizing a non-formal natural language.

It should be pointed out that the vocabulary of the formal target language of the present invention (2009) comprises notional words and function words (relation words), which accords with natural languages, while the vocabulary of the invention "the Meaning Formalization Method of Computer-aided Translanguage Information Exchange" (1999) was limited to notional words (relation marks displaced function words), which did not accord with natural languages.

Compared with existing technologies, the present invention has the following features:

1 A non-formal source language can be formalized either in an interactive way or in an automatic way; a formal source language can be transformed in an automatic way either into a formal target language or into a non-formal target language.

2 Non-fixed language segment modes for formalizing a non-formal source language and non-fixed language segment transformation rules for transforming a formal source language into a non-formal target language are independent of each other. So, non-fixed language segment modes can be modified and added with non-fixed language segment transformation rules completely uninvolved, and non-fixed language segment transformation rules can be modified and added with non-fixed language segment modes completely uninvolved. This makes a machine translation system easily scalable.

3 Formalizing a non-formal source language is the common foundation for transforming it into various target languages. This makes the present invention especially suitable for multilingual machine translation.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings.

DETAILED DESCRIPTION OF THE PREFERRED EMBODIMENT

Figure 1:
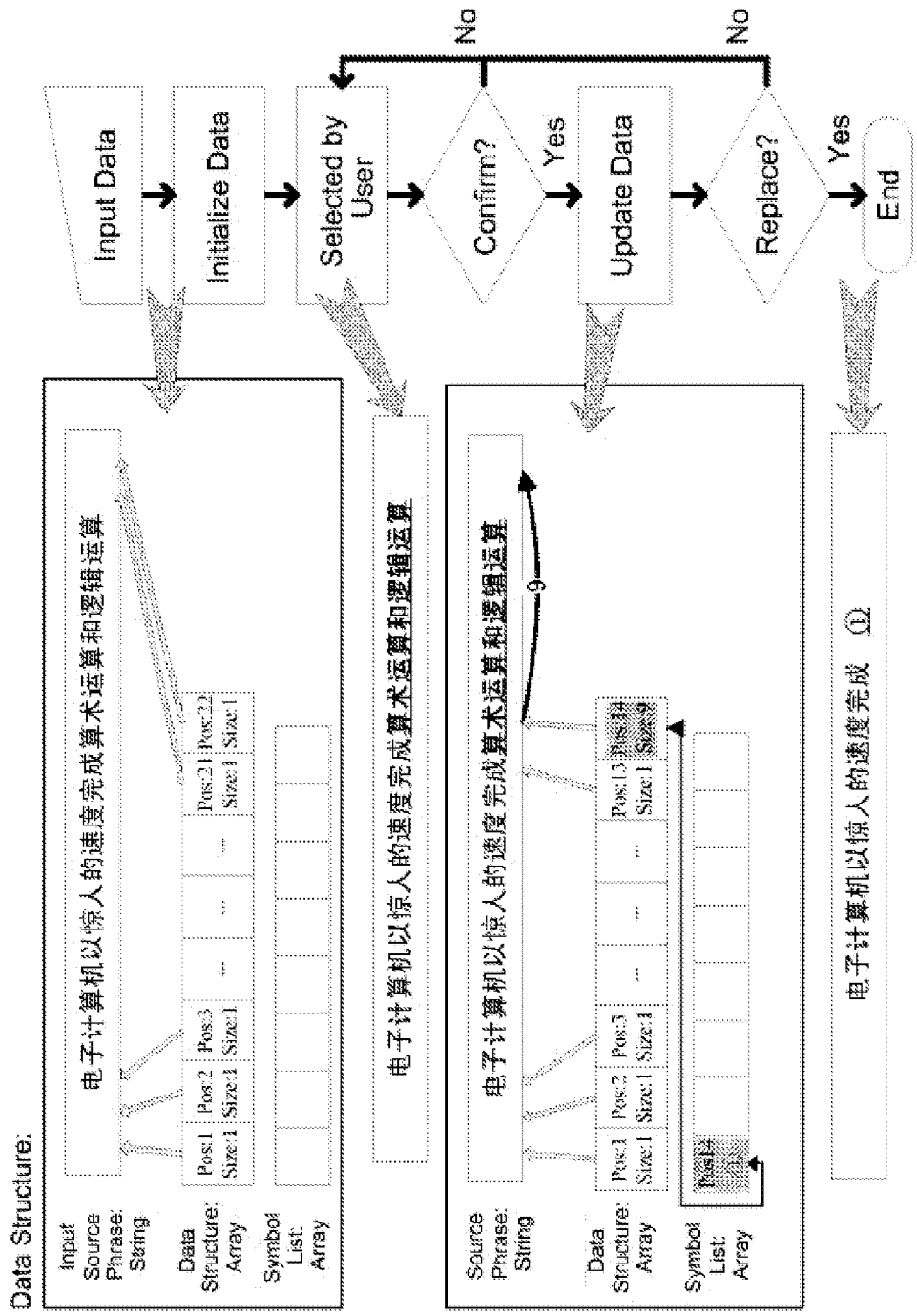
FIG. 1 is a block diagram showing the process of pre-processing by means of substitution marks.

Hereafter, the preferred embodiments will be described in reference to the accompanying drawings.

The First Preferred Embodiment of the Method of Machine Translation

This preferred embodiment is a method of machine translation for translating a non-formal source language into a formal target language, comprising the steps of: (a) formalizing a non-formal source language in an interactive way by first identifying one by one the fixed language segments of an initial language segment of a non-formal source language and tagging the fixed language segments with meaning marks until the last fixed language segment and then composing level by level the non-fixed language segments of the initial language segment and tagging the non-fixed language segments with key component marks and relation marks until the non-fixed language segment constituted by the whole initial language segment; (b) transforming the formal source language into a formal target language in an automatic way by transforming the fixed language segments of the source language into language segments of the target language according to fixed language segment transformation rules.

Marks (1) Fixed language segment marks: A fixed language segment mark is used as a sign of a fixed language segment. For example, a line drawn under a fixed language segment is used as a fixed language segment mark. A word, a phrase, an idiom, a saying, a person name, a place name, etc. can be regarded as a fixed language segment. A letter string (i.e. a number of letters between two spaces), a Chinese character or a Japanese kana is a writing unit (i.e. a writing segment with an independent shape). A number of writing units constitute a fixed language segment. The fixed language segment mark of a fixed language segment constituted by one writing unit can be omitted.

The following are examples of fixed language segment marks:

The Great St. Bernard Pass is the highest mountain pass in Europe.

圣伯纳德大山口是<u>欧洲最高的山口</u>

(2) Meaning marks: A meaning mark is used to make fixed language segments of the same form and different meanings to become fixed language segments of different forms and different meanings. For example, the figure at the top right of a fixed language segment is used as a meaning mark.

The following are examples of meaning marks:

research[1] research[2]

(3) Combination marks: A combination mark is used to indicate that a number of language segments combine to form one language segment. For example: bracket-type combination marks

〖{[(〖{[(〖{[()]}〗)]}〗)]}〗 line-type combination marks

The following are examples of bracket-type combination marks:

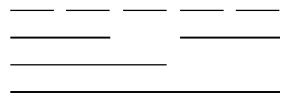

The following are examples of line-type combination marks:

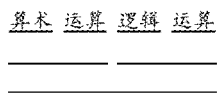

(4) Key component marks: A key component mark is used as a sign of a key component. For example, an asterisk on the side of a key component is used as a key component mark.

The following are examples of key component marks:

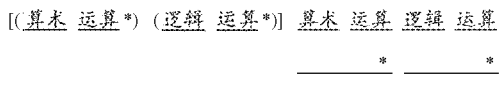

The object of the key component contains the object of the formed language segment or is identical to the object of the formed language segment. It is preferable to use two kinds of key component marks as signs of two kinds of key components: If the object of the key component contains the object of the formed language segment, a * on the side of the key component is used as a key component mark; If the object of the key component is identical to the object of the formed language segment, a # on the side of the key component is used as a key component mark.

The following are examples of two kinds of key component marks:

```
clever man        clever John
_____*_____      _____#_____ the man who wrote this book    John, who wrote this book
_____ _____            ____ _____
   *                             #
```

(5) Relation marks: A relation mark is used as a sign of a relation between components of a formed language segment. For example, a figure between components is used as a relation mark.

The following are examples of relation marks:

[(算术 4 运算*)21 (逻辑 4 运算*)]   算术 运算 逻辑 运算
                                   ____4__*  ____4__*
                                          _____21_____

1 The object of the non-key component accepts the object of the key component.
2 The object of the non-key component possesses the object of the key component.
3 The object of the non-key component restricts the object of the key component.
4 The object of the non-key component is the attribute of the object of the key component.
5 The object of the non-key component is the manner of the object of the key component.
6 The object of the non-key component is the purpose of the object of the key component.
7 The object of the non-key component is the result of the object of the key component.
8 The object of the non-key component is the means of the object of the key component.
9 The object of the non-key component is the time of the object of the key component.
10 The object of the non-key component is the place of the object of the key component.
11 The object of the non-key component is the starting point of the object of the key component.
12 The object of the non-key component is the direction of the object of the key component.
13 The object of the non-key component is the material of the object of the key component.
14 The object of the non-key component is the condition of the object of the key component.
15 The object of the non-key component is the reason of the object of the key component.
16 The object of the non-key component is the frequency of the object of the key component.
17 The object of the non-key component is the scope of the object of the key component.
18 The object of the non-key component is the degree of the object of the key component.
19 The object of the left component is the subject of the object of the right component.
20 The object of the key component is the subject of the object of the non-key component.
21 The relation between the objects of the components is addition.

22 The relation between the objects of the components is choice.

(6) Grammatical attribute marks: A grammatical attribute mark is used as a sign of the grammatical attribute of a language segment. For example, capital Latin letters are used as grammatical attribute marks.

The following are examples of grammatical attribute marks based on English and used in English:

noun N, transitive verb VT, intransitive verb VI, link verb LV, modal verb MV, adjective A, ordinary adverb AD, interrogative adverb IAD, relative adverb RAD, nominal pronoun NP, adjectival pronoun AP, interrogative pronoun IP, relative pronoun RP, numeral NUM, article ART, preposition P, coordinating conjunction CC, subordinating conjunction SC; finite verb FV, infinitive INF, -ING participle ING, -ED participle ED; active AC, passive PA; sentence S, attributive clause ATC, adverbial clause ADC, nominal clause NC The following are examples of grammatical attribute marks based on Chinese and used in Chinese:

名词 (noun) M, 及物动词 (transitive verb) JD, 不及物动词 (intransitive verb) BJD, 连系动词 (link verb) LD, 情态动词 (modal verb) QD, 形容词 (adjective) X, 一般副词 (ordinary adverb) F, 疑问副词 (interrogative adverb) YF, 名词性代词 (nominal pronoun) MD, 形容词性代词 (adjectival pronoun) XD, 疑问代词 (interrogative pronoun) YD, 数词 (numeral) S, 介词 (preposition) J, 并列连词 (coordinating conjunction) BL, 从属连词 (subordinating conjunction) CL; 句 (sentence) JU, 定语从句 (attributive clause) DC, 状语从句 (adverbial clause) ZC, 名词性从句 (nominal clause) MC (7) Semantic attribute mark: A semantic attribute mark is used as a sign of a semantic attribute of a language segment. For example, small Latin letters are used as semantic attribute marks.

The following are examples of semantic attribute marks based on English and used in English:

human hu, living being li, object ob, substance su, thing th, time ti, place pl, unit un, concrete action ca, abstract action aa, condition co, mental activities ma, concrete character cc, abstract character ac, frequency fr, degree de, negation ne The following are examples of semantic attribute marks based on Chinese and used in Chinese:

人 (human) re, 生物 (living being) sw, (物体 object) wt, 物质 (substance) wz, 事物 (thing) ww, 时间 (time) sj, 处所 (place) cs, 单位 (unit) dw, 具体行为 (concrete action) jw, 抽象行为 (abstract action) cw, 状态 (condition) zt, 心理活动 (mental activities) xh, 具体性质 (concrete character) jx, 抽象性质 (abstract character) cx, 频度 (frequency) pd, 程度 (degree) cd, 否定 (negation) fd Substitution It is preferable for step (a) to include a pre-processing by means of substitution marks, i.e. separating an initial language segment into a number of sub-segments by means of substitution marks in advance, and then formalizing the sub-segments respectively.

A substitution mark is used as a sign of substitution. For example, circled figures are used as substitution marks. 算术运算和 逻辑运算=$\hat{1}$ The pre-processing by means of substitution marks makes it more convenient to formalize a language segment with a complex structure.

The following is an example of the pre-processing by means of substitution marks:

Step 1: A screen displays

电子计算机以惊人的速度完成算术运算和逻辑运算

Step 2: A user selects on the screen 电子计算机以惊人的速度完成 算术运算和逻辑运算

Step 3: The user presses the function key [substitution]

Step 4: The screen displays

算术运算和逻辑运算=$\hat{1}$

电子计算机 以惊人的速度完成

Then the processor formalizes the sub-segments respectively.

FIG. 1 is a block diagram showing the computer realization of pre-processing by means of substitution marks.

The following is an example of the process of pre-processing by means of substitution marks.

Step 1: saving the phrase input as data, "电子计算机以惊人的速度完 成算术运算和逻辑运算", as a string type, initializing the data, and forming a node array in which each node has a corresponding text unit, wherein the placeholder list is empty;

Step 2: A user selects on the screen 算术运算和 逻辑运算

Step 3: The user presses the function key [substitution]

Step 4: updating the node array, wherein the 14th node corresponds to the phrase "算 术运算和逻辑运算", which has a capacity of 9 text units, wherein the symbol "$\hat{1}$" refers to the selected phrase, and the monitor displays the updated phrase which is processed as data.

Formalizing a Non-Formal Source Language in an Interactive Way

The first step of this preferred embodiment is formalizing a non-formal source language in an interactive way. It includes the process of identifying and tagging fixed language segments in an interactive way and the process of composing and tagging non-fixed language segments in an interactive way.

The Process of Identifying and Tagging Fixed Language Segments in an Interactive Way The process of identifying and tagging fixed language segments in an interactive way is as follows: A fixed language segment mode in a computer storage contains a fixed language segment and its meaning mark (fixed language segments of the same form and different meanings bearing meaning marks); in the process of identifying and tagging fixed language segments in an interactive way, a computer processor judges in turn whether there exists in the computer storage at least one fixed language segment beginning with the one writing unit at the forefront, whether there exists in the computer storage at least one fixed language segment beginning with the two writing units at the forefront, whether there exists in the computer storage at least one fixed language segment beginning with the three writing units at the forefront, and so on; if there exists in the computer storage at least one fixed language segment beginning with the n (a natural number, and the same below) writing unit(s) at the forefront and there does not exist in the computer storage at least one fixed language segment beginning with the n+1 writing units at the forefront, the computer processor identifies the n writing unit(s) at the forefront as a fixed language segment and tags it with a meaning mark according to a fixed language segment mode, and after that a user confirms or revises the mark; if the computer processor finds out that there does not exist in the computer storage at least one fixed language segment beginning with the one writing unit at the forefront of the remaining language segment, the user identifies the fixed language segment beginning with the one writing unit at the forefront of the remaining language segment and tags it with a meaning mark; the process is repeated until the last fixed language segment.

The following are examples of fixed language segment modes: methods[1] data processing automatic[1]

The following is an example of the process of identifying and tagging fixed language segments in an interactive way:

ABCDEFGHIJKLMNOPQRSTUVWXYZ is a language segment (A, B, C . . . X, Y, Z are writing units).

The computer processor finds out in turn that there exists in the computer storage at least one fixed language segment beginning with A, there exists in the computer storage at least one fixed language segment beginning with AB, there exists in the computer storage at least one fixed language segment beginning with ABC, and there does not exist in the computer storage at least one fixed language segment beginning with ABCD, so the computer processor identifies ABC as a fixed language segment, finds all the fixed language segment modes which can be used in the computer storage, chooses one of the fixed language segment modes in the choice order that a mode with a larger total number of use is prior to a mode with a smaller total number of use, and tags ABC with a meaning mark according to the fixed language segment mode, and after that a user confirms or revises the mark; the process is repeated until the last fixed language segment.

The reason why the computer processor identifies ABC as a fixed language segment is as follows: There exists in the computer storage at least one fixed language segment beginning with A, there exists in the computer storage at least one fixed language segment beginning with AB, there exists in the computer storage at least one fixed language segment beginning with ABC, and there does not exist in the computer storage at least one fixed language segment beginning with ABCD, so it is possible for the fixed language segment beginning with A to be A, AB or ABC and it is impossible for it to be ABCD or any other language segment beginning with A(ABCDE, ABCDEF . . . ). The computer processor identifies ABC, which is the longest of the three (A, AB, ABC), as a fixed language segment.

The computer processor finds out that there does not exist in the computer storage at least one fixed language segment beginning with L, so the user identifies LMNO, which is a language segment beginning with L, as a fixed language segment, and tags it with a meaning mark; the computer processor puts into storage the new fixed language segment mode automatically. After that the next fixed language segment is identified and tagged in an interactive way.

The process of a user's confirming or revising a meaning mark is as follows:

First, a screen displays all the fixed language segment modes which can be used and their meanings. For example:

degree$^1$ [a step in a process]
degree$^2$ [a step in a direct hereditary line of descent]
degree$^3$ [relative social or official rank]
degree$^4$ [relative intensity or amount]
degree$^5$ [the extent of a state of being or an action]
degree$^6$ [a unit division of a temperature scale]
degree$^7$ [a planar unit of angular measure]
degree$^8$ [a unit of latitude or longitude]
degree$^9$ [an academic title]
degree$^{10}$ [a classification of a specific crime]
degree$^{11}$ [a classification of the severity of an injury]
degree$^{12}$ [a form used in the comparison of adjectives and adverbs]
degree$^{13}$ [a note of a diatonic scale]

Then, a user chooses one of the meaning marks and clicks on it.

The following is an English example of the process of identifying and tagging fixed language segments in an interactive way:

Computer science is the branch of science that is concerned with methods relating to data processing performed by automatic means.

A computer processor finds out in turn that there exists in the computer storage at least one fixed language segment beginning with computer (A fixed language segment beginning with computer is a fixed language segment the first writing unit of which is computer, e.g. computer, computer assisted instruction, computer graphics), there exists in the computer storage at least one fixed language segment beginning with computer science (A fixed language segment beginning with computer science is a fixed language segment the first and second writing units of which are computer science, e.g. computer science, computer science and technology, computer science department), and there does not exist in the computer storage at least one fixed language segment beginning with computer science is (A fixed language segment beginning with computer science is a fixed language segment the first, second and third writing units of which are computer science is), so the computer processor identifies computer science as a fixed language segment, finds all the fixed language segment modes which can be used in the computer storage, chooses one of the fixed language segment modes in the choice order that a mode with a larger total number of use is prior to a mode with a smaller total number of use, and tags computer science with a meaning mark according to the fixed language segment mode, and after that a user confirms the meaning mark.

The computer processor finds out in turn that there exists in the computer storage at least one fixed language segment beginning with is and there does not exist in the computer storage at least one fixed language segment beginning with is the, so the computer processor identifies is as a fixed language segment, finds all the fixed language segment modes which can be used in the computer storage, chooses one of the fixed language segment modes in the choice order that a mode with a larger total number of use is prior to a mode with a smaller total number of use, and tags is with a meaning mark according to the fixed language segment mode, and after that the user confirms the meaning mark.

The computer processor finds out in turn that there exists in the computer storage at least one fixed language segment beginning with the and there does not exist in the computer storage at least one fixed language segment beginning with the branch, so the computer processor identifies the as a fixed language segment, finds all the fixed language segment modes which can be used in the computer storage, chooses one of the fixed language segment modes in the choice order that a mode with a larger total number of use is prior to a mode with a smaller total number of use, and tags the with a meaning mark according to the fixed language segment mode, and after that the user confirms the meaning mark.

The computer processor finds out in turn that there exists in the computer storage at least one fixed language segment beginning with branch and there does not exist in the computer storage at least one fixed language segment beginning with branch of, so the computer processor identifies branch as a fixed language segment, finds all the fixed language segment modes which can be used in the computer storage, chooses one of the fixed language segment modes in the choice order that a mode with a larger total number of use is prior to a mode with a smaller total number of use, and tags branch with a meaning mark according to the fixed language segment mode, and after that the user confirms the meaning mark.

The computer processor finds out in turn that there exists in the computer storage at least one fixed language segment beginning with of and there does not exist in the computer storage at least one fixed language segment beginning with of science, so the computer processor identifies of as a fixed language segment, finds all the fixed language segment modes which can be used in the computer storage, chooses one of the fixed language segment modes in the choice order that a mode with a larger total number of use is prior to a mode with a smaller total number of use, and tags of with a meaning mark according to the fixed language segment mode, and after that the user confirms the meaning mark.

The computer processor finds out in turn that there exists in the computer storage at least one fixed language segment beginning with science and there does not exist in the computer storage at least one fixed language segment beginning with science that, so the computer processor identifies science as a fixed language segment, finds all the fixed language segment modes which can be used in the computer storage, chooses one of the fixed language segment modes in the choice order that a mode with a larger total number of use is prior to a mode with a smaller total number of use, and tags science with a meaning mark according to the fixed language segment mode, and after that the user confirms the meaning mark.

Computer science is[1] the branch[3] of science[1] . . .

. . .

The reason why the computer processor identifies computer science as a fixed language segment is as follows: There exists in the computer storage at least one fixed language segment beginning with computer, there exists in the computer storage at least one fixed language segment beginning with computer science, and there does not exist in the computer storage at least one fixed language segment beginning with computer science is, so it is possible for the fixed language segment beginning with computer to be computer or computer science and it is impossible for it to be computer science is or any other language segment beginning with computer (computer science is the, computer science is the branch, computer science is the branch of . . . ). The computer processor identifies computer science, which is the longer of the two (computer, computer science), as a fixed language segment.

Figure 2:
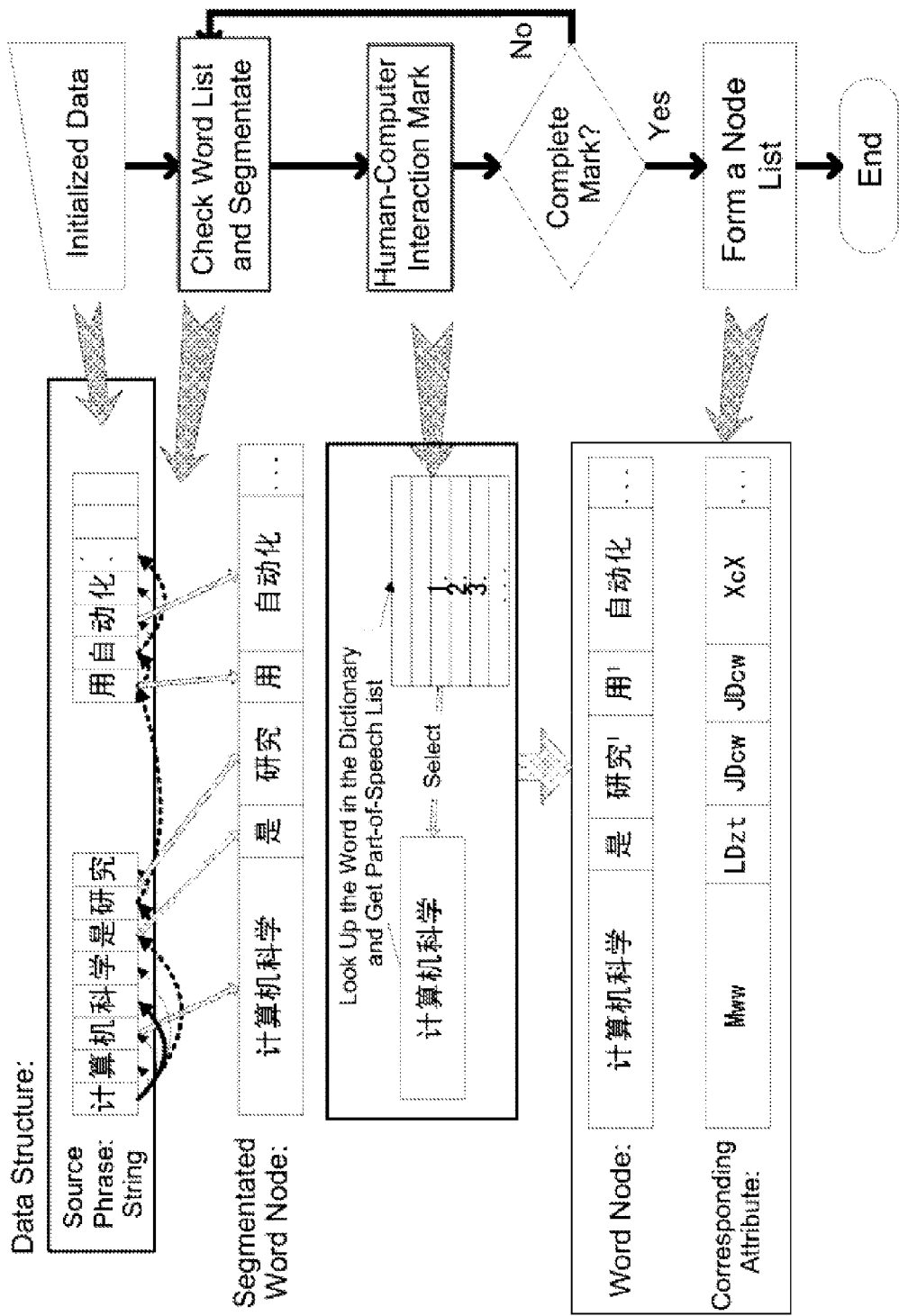
FIG. 2 is a block diagram showing the process of identifying and tagging fixed language segments in an interactive way.

The following is a Chinese example of the process of identifying and tagging fixed language segments in an interactive way:

FIG. 2 is a block diagram showing the process of identifying and tagging fixed language segments in an interactive way, wherein heavy lines indicate no existence of the set phrases, thin line arrows indicate the existence of the set phrases, and dashed arrows indicate no existence of the set phrase which starts this way.

计算机科学 是研究用自动化工具完成数据处理 的方法的一门科学.

The computer processor finds out in turn that there exists in the computer storage at least one fixed language segment beginning with 计 (A fixed language segment beginning with 计 is a fixed language segment the first writing unit of which is 计, e.g. 计, 计划, 计算机, 计量单位, 计算机辅助设计), there exists in the computer storage at least one fixed language segment beginning with 计算 A fixed language segment beginning with 计算 is a fixed language segment the first and second writing units of which are 计算, e.g. 计算、、计算机、, 计算机辅助设计), there exists in the computer storage at least one fixed language segment beginning with 计算机 (A fixed language segment beginning with 计算机 is a fixed language segment the first, second and third writing units of which are 计算机, e.g. 计算机, 计算机安全, 计算机辅助设计), there exists in the computer storage at least one fixed language segment beginning with 计算机科 (A fixed language segment beginning with 计算机科 is a fixed language segment the first, second, third and fourth writing units of which are 计算机科, e.g. 计算机科学、、计算机科学技术、、计算机科学家), there exists in the computer storage at least one fixed language segment beginning with 计算机科学 (A fixed language segment beginning with 计算机科学 is a fixed language segment the first, second, third, fourth and fifth writing units of which are 计算机科学, e.g. 计算机科学、、计算机科学技术、、计算机科学家), and there does not exist in the computer storage at least one fixed language segment beginning with 计算机科学是 (A fixed language segment beginning with 计算机科学是 is a fixed language segment the first, second, third, fourth, fifth and sixth writing units of which are 计算机科学是), so the computer processor identifies 计算机科学 as a fixed language segment, finds all the fixed language segment modes which can be used in the computer storage, chooses one of the fixed language segment modes in the choice order that a mode with a larger total number of use is prior to a mode with a smaller total number of use, and tags 计算机科学 with a meaning mark according to the fixed language segment mode, and after that a user confirms the meaning mark.

The computer processor finds out in turn that there exists in the computer storage at least one fixed language segment beginning with 是 and there does not exist in the computer storage at least one fixed language segment beginning with 是研, so the computer processor identifies 是 as a fixed language segment, finds all the fixed language segment modes which can be used in the computer storage, chooses one of the fixed language segment modes in the choice order that a mode with a larger total number of use is prior to a mode with a smaller total number of use, and tags 是 with a meaning mark according to the fixed language segment mode, and after that the user confirms the meaning mark.

The computer processor finds out in turn that there exists in the computer storage at least one fixed language segment beginning with 研, there exists in the computer storage at least one fixed language segment beginning with 研究, and there does not exist in the computer storage at least one fixed language segment beginning with 研究用, so the computer processor identifies 研究 as a fixed language segment, finds all the fixed language segment modes which can be used in the computer storage, chooses one of the fixed language segment modes in the choice order that a mode with a larger total number of use is prior to a mode with a smaller total number of use, and tags 研究 with a meaning mark according to the fixed language segment mode, and after that the user confirms the meaning mark.

The computer processor finds out in turn that there exists in the computer storage at least one fixed language segment beginning with 用, and there does not exist in the computer storage at least one fixed language segment beginning with 用自, so the computer processor identifies 用 as a fixed language segment, finds all the fixed language segment modes which can be used in the computer storage, chooses one of the fixed language segment modes in the choice order that a mode with a larger total number of use is prior to a mode with a smaller total number of use, and tags 用 with a meaning mark according to the fixed language segment mode, and after that the user confirms the meaning mark.

The computer processor finds out in turn that there exists in the computer storage at least one fixed language segment beginning with 自, there exists in the computer storage at least one fixed language segment beginning with 自动, there exists in the computer storage at least one fixed language segment beginning with 自动化, and there does not exist in the computer storage at least one fixed language segment beginning with 自动化工, so the computer processor identifies 自动化 as a fixed language segment, finds all the fixed language segment modes which can be used in the computer storage, chooses one of the fixed language segment modes in the choice order that a mode with a larger total number of use is prior to a mode with a smaller total number of use, and tags 自动化 with a meaning mark according to the fixed language segment mode, and after that the user confirms the meaning mark.

计算机科学 是  研究$^1$  用$^1$  自动化 . . .
. . .

The reason why the computer processor identifies 计算机科学 as a fixed language segment is as follows: There exists in the computer storage at least one fixed language segment beginning with 计, there exists in the computer storage at least one fixed language segment beginning with 计算, there exists in the computer storage at least one fixed language segment beginning with 计算机, there exists in the computer storage at least one fixed language segment beginning with 计算机科, there exists in the computer storage at least one fixed language segment beginning with 计算机科学, and there does not exist in the computer storage at least one fixed language segment beginning with 计算机科学是, so it is possible for the fixed language segment beginning with 计 to be 计, 计算, 计算机, 计算机科 or 计算机科学 and it is impossible for it to be 计算 机科学是 or any other language segment beginning with 计 (计算机科学是研, 计算机科 学是研究, 计算机科学是研究用, . . . ). The computer processor identifies 计算机科学 which is the longest of the five (计, 计算, 计算机, 计算机科, 计算机科学 ), as a fixed language segment.

The Process of Composing and Tagging Non-Fixed Language Segments in an Interactive Way The process of composing and tagging non-fixed language segments in an interactive way is as follows: A computer processor and a user compose level by level non-fixed language segments of an initial language segment and tag one by one the non-fixed language segments with key component marks and relation marks until the non-fixed language segment constituted by the whole initial language segment.

The following is an example of the process of composing and tagging non-fixed language segments in an interactive way:

Step 1: A screen displays

Please compose a non-fixed language segment.

Step 2: A user clicks on the first and the last writing units of the first non-fixed language segment at the first level.

Step 3: The screen displays a combination mark of the first non-fixed language segment at the first level.

Step 4: The screen displays

Please tag it with a key component mark

Step 5: The user clicks on the position of the key component mark.

Step 6: The screen displays the key component mark.

Step 7: The screen displays

Please choose a relation mark

1 The object of the non-key component accepts the object of the key component.

2 The object of the non-key component possesses the object of the key component.

3 The object of the non-key component restricts the object of the key component.

4 The object of the non-key component is the attribute of the object of the key component.

5 The object of the non-key component is the manner of the object of the key component.

6 The object of the non-key component is the purpose of the object of the key component.

7 The object of the non-key component is the result of the object of the key component.

8 The object of the non-key component is the means of the object of the key component.

9 The object of the non-key component is the time of the object of the key component.

10 The object of the non-key component is the place of the object of the key component.

11 The object of the non-key component is the starting point of the object of the key component.

12 The object of the non-key component is the direction of the object of the key component.

13 The object of the non-key component is the material of the object of the key component.

14 The object of the non-key component is the condition of the object of the key component.

15 The object of the non-key component is the reason of the object of the key component.

16 The object of the non-key component is the frequency of the object of the key component.

17 The object of the non-key component is the scope of the object of the key component.

18 The object of the non-key component is the degree of the object of the key component.

19 The object of the left component is the subject of the object of the right component.

20 The object of the key component is the subject of the object of the non-key component.

21 The relation between the objects of the components is addition.

22 The relation between the objects of the components is choice.

Step 8: The user clicks on the relation mark he chooses.

Step 9: The screen displays the relation mark.

Step 10: The screen displays

Please compose a non-fixed language segment.

Step 11: The user clicks on the first and the last writing units of the second non-fixed language segment at the first level.

. . .

The following is an English example:

An initial language segment methods$^1$ relating to data processing performed$^1$ by$^2$ automatic$^1$ means$^1$ A non-fixed language segment at the first level methods$^1$ relating to data processing performed$^1$ by$^2$ automatic$^1$ means$^1$
_____4___*

A non-fixed language segment at the second level methods[1] relating to data processing performed[1] by[2] automatic[1] means[1]
　　　　　　　　　　　　　　　　　　　　　　　　4　　*
　　　　*

A non-fixed language segment at the third level methods[1] relating to data processing performed[1] by[2] automatic[1] means[1]
　　　　　　　　　　　　　　　　　　　　　　　　4　　*
　　　　　　*
　　*　　　20

A non-fixed language segment at the fourth level methods[1] relating to data processing performed[1] by[2] automatic[1] means[1]
　　　　　　　　　　　　　　　　　　　　　　　　4　　*
　　　　　　*
　　*　　　20
*

Figure 3:
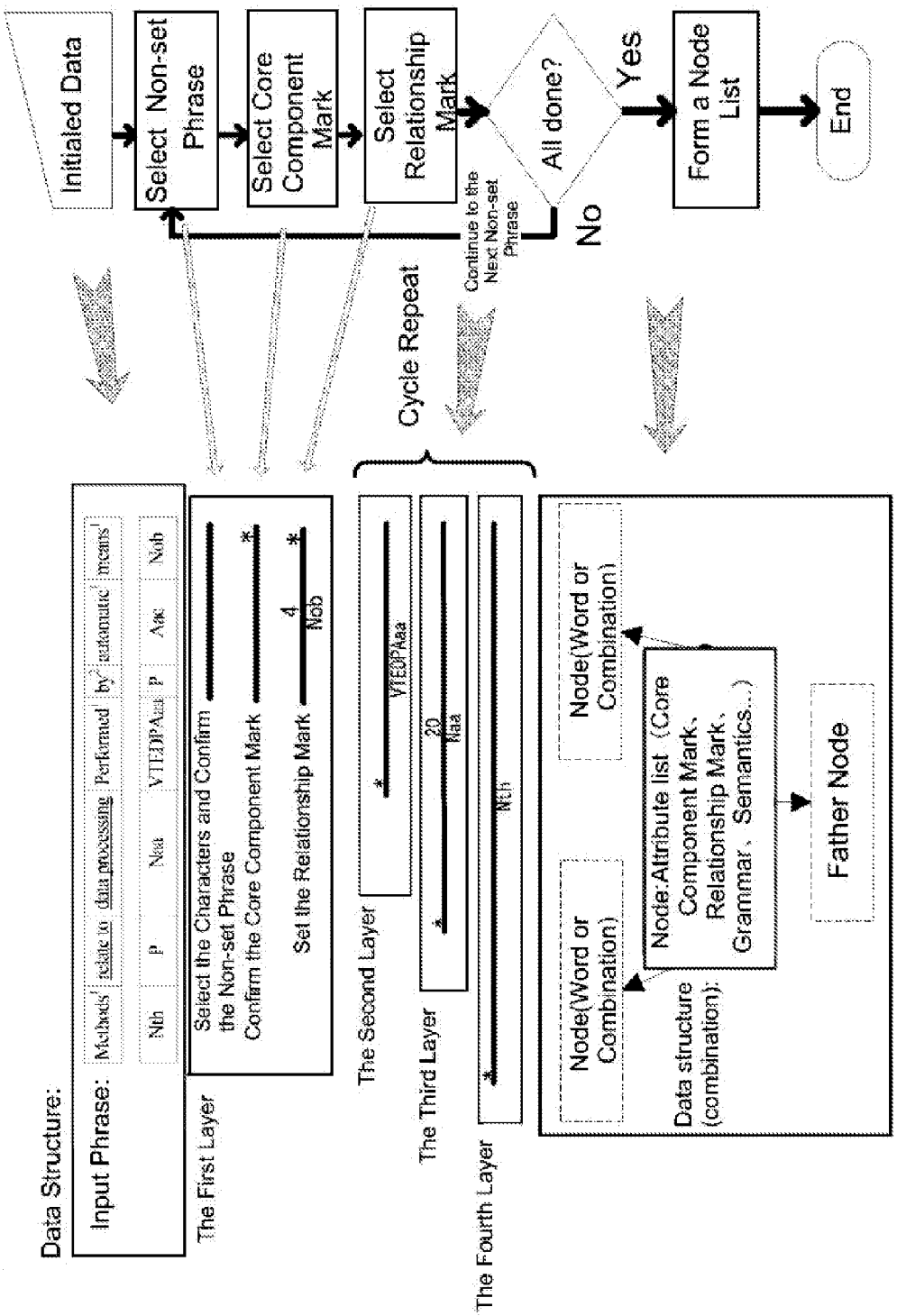
FIG. 3 is a block diagram showing the process of composing and tagging non-fixed language segments in an interactive way.

The Computer Realization of Composing and Tagging Non-Fixed Language Segments in an Interactive Way FIG. 3 is a block diagram showing the process of composing and tagging non-fixed language segments in an interactive way.

Step 1: A screen displays an initial language segment and displays

Please compose a non-fixed language segment.

Step 2: accepting the two clicks by the user, obtaining the first character and the last character of the non-set phrase, marking the string, which is started with the first character and ended with the last character, with the horizontal line type combination mark, and prompting "Please make the core component mark";

Step 3: if the user clicks the position of core component mark, making the core component mark by the processor, and if the user clicks the core component mark, deleting the core component mark;

Step 4: right clicking the horizontal line type combination mark of the non-set phrase with the mouse by the user, wherein the processor popups a right click menu containing the two options "Relationship tag list" and "Cancel non-set phrase", if the user clicks a relationship mark in the right click menu, making the relationship mark by the processor, and if the user selects "Cancel non-set phrase", deleting the horizontal line type combination mark of the non-set phrase;

Step 5: repeating Step 2 to Step 4 until obtaining a non-set phrase constituted by the whole initial phrase;

Step 6: forming a node list.

Transforming a Formal Source Language into a Formal Target Language in an Automatic Way The second step of this preferred embodiment is transforming in an automatic way fixed language segments of a source language into language segments of a target language according to fixed language segment transformation rules.

The following are examples of the process of transforming a formal source language into a formal target language in an automatic way:

Non-formal English methods relating to data processing performed by automatic means Formal English methods[1] relating to data processing performed[1] by[2] automatic[1] means[1]
　　　　　　　　　　　　　　　　　　　　　　　　4　　*
　　　　　　　*
　　　　*　　　20
*

(This is a result of formalizing a non-formal source language in an interactive way.)

A formal source language as a result of formalizing a non-formal source language in an automatic way bears grammatical attribute marks and semantic attribute marks. For example:

methods[1] relating to data processing performed[1] by[2] automatic[1] means[1]
　Nth　　　P　　　　Naa　　　VTEDPAaa　P　　Aac　　Nob
　　　　　　　　　　　　　　　　　　　　　　　　4　　*
　　　　　　　　　　　　　　　　　　　　　　　　Nob
　　　　　　　*
　　　　　　　　　　　　　　　　VTEDPAaa
　　　　*　　　20
　　　　　　　　　　Naa
*
　　　Nth (This is a result of formalizing a non-formal source language in an automatic way.)

First, a computer processor deletes the grammatical attribute marks and semantic attribute marks in an automatic way. For example:

methods[1] relating to data processing performed[1] by[2] automatic[1] means[1]
　　　　　　　　　　　　　　　　　　　　　　　　4　　*
　　　　　　*
　　*　　　20
*

It is likewise feasible to keep the grammatical attribute marks and semantic attribute marks.

Then, the computer processor transforms in an automatic way the fixed language segments of the source language (English) into language segments of the target language (Chinese) according to fixed language segment transformation rules. Fixed language segment transformation rules

| 英语 | 汉语 | 法语 | 德语 | 日语 |
|---|---|---|---|---|
| methods[1] | 方法 | ***** | ***** | ***** |
| relating to | 有关[1] | ***** | ***** | ***** |
| data processing | 数据处理 | ***** | ***** | ***** |
| performed[1] | 被执行 | ***** | ***** | ***** |
| by[2] | 被[5] | ***** | ***** | ***** |
| automatic[1] | 自动[3] | ***** | ***** | ***** |
| means[1] | 工具[1] | ***** | ***** | ***** |

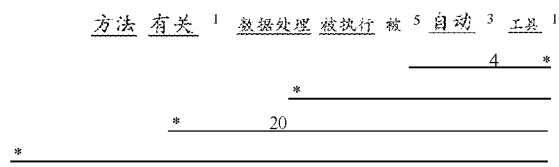

After a user clicks on a meaning mark, a screen displays the meaning represented by this meaning mark. For example: After a user clicks on ³ in 自动 ³, a screen displays: 自动 ³ [能借助自身的控制系统进行工作]. After a user clicks on a relation mark, a screen displays the relation represented by this relation mark. For example: After a user clicks on 4, a screen displays: 4 表示 非核心成分的对象是核心成分的对象的属性.

Non-Formal Chinese

计算机辅助 教学通常包含学 生和计算机的对话

Formal Chinese

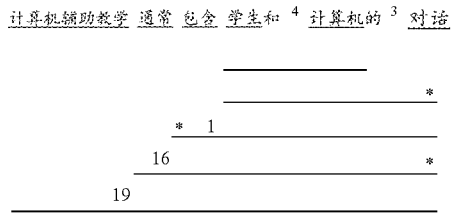

和 各成分的对象 具有联合关系
的 非核心成分 的对象施行核心成分的对象

The computer processor transforms in an automatic way the fixed language segments of the source language (Chinese) into language segments of the target language (English) according to fixed language segment transformation rules.

Formal English

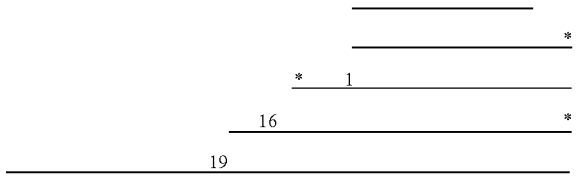

involve² [contain as a part]
and¹ [The relation between the objects of the components is addition.]
of¹⁴ [The object of the non-key component executes the object of the key component.]

Figure 6:
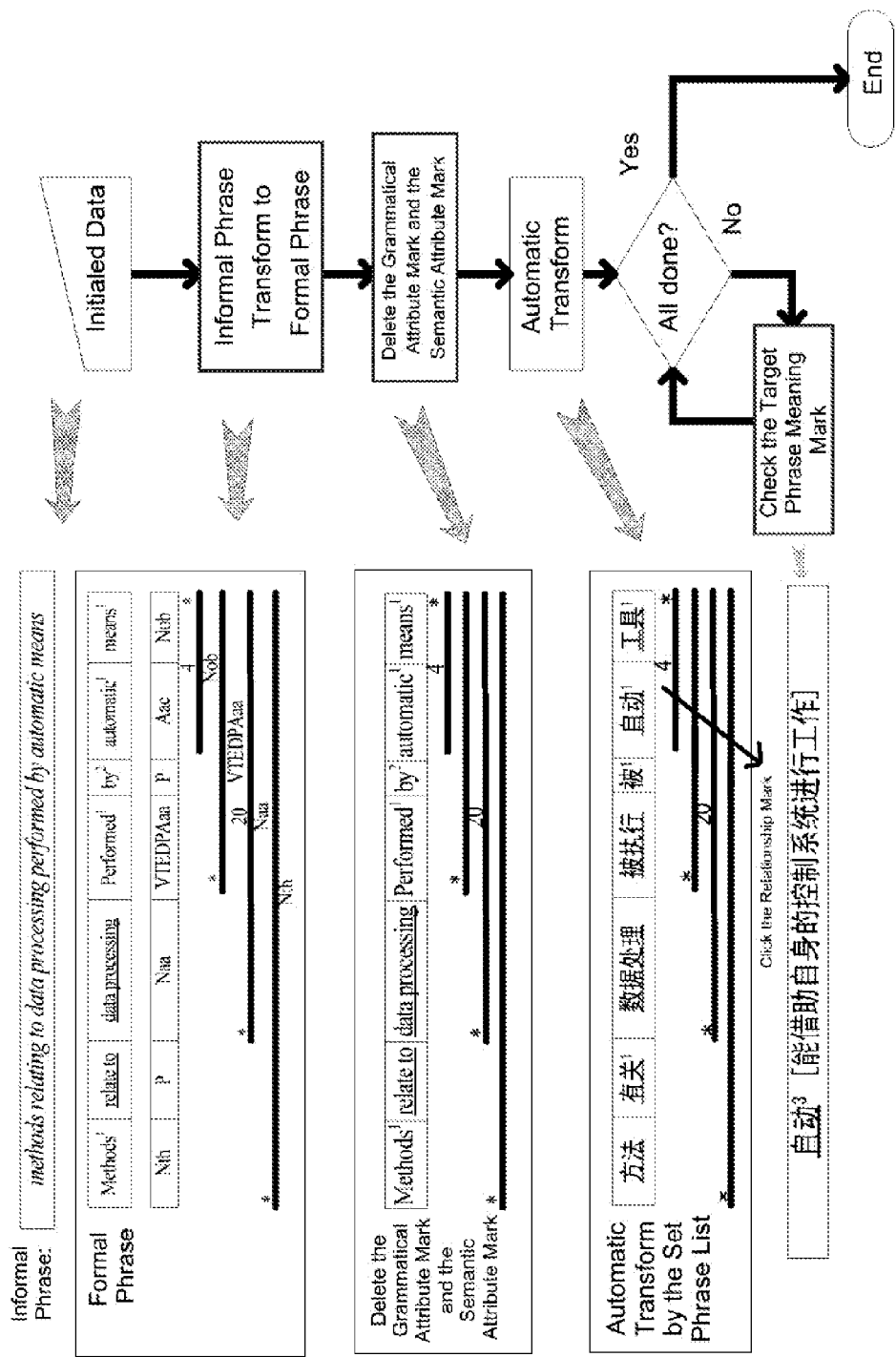
FIG. 6 is a block diagram showing the process of transforming a formal source language into a formal target language in an automatic way.

The Computer Realization of Transforming a Formal Source Language into a Formal Target Language in an Automatic Way FIG. 6 is a block diagram showing the process of transforming a formal source language into a formal target language in an automatic way.

Step 1: If a formal source language contains grammatical attribute marks and semantic attribute marks, a computer processor deletes the grammatical attribute marks and semantic attribute marks.

Step 2: The computer processor searches a list of fixed language segment transformation rules for matching fixed language segment transformation rules and transforms fixed language segments of a source language into fixed or non-fixed language segments of a target language according to the matching fixed language segment transformation rules, fixed language segments of the target language bearing meaning marks.

Step 3: After a user clicks on a meaning mark, a screen displays the meaning represented by this meaning mark, and, after a user clicks on a relation mark, a screen displays the relation represented by this relation mark.

The Second Preferred Embodiment of the Method of Machine Translation

This preferred embodiment is a method of machine translation for translating a non-formal source language into a formal target language, comprising the steps of: (a) formalizing a non-formal source language in an automatic way by first identifying one by one the fixed language segments of an initial language segment of a non-formal source language and tagging the fixed language segments with meaning marks until the last fixed language segment and then composing level by level the non-fixed language segments of the initial language segment and tagging the non-fixed language segments with key component marks and relation marks until the non-fixed language segment constituted by the whole initial language segment; (b) transforming the formal source language into a formal target language in an automatic way by transforming in an automatic way the fixed language segments of the source language into language segments of the target language according to fixed language segment transformation rules.

Marks (See the first preferred embodiment of the method of machine translation.)

Substitution (See the first preferred embodiment of the method of machine translation.)

Formalizing a Non-Formal Source Language in an Automatic Way

The first step of this preferred embodiment is formalizing a non-formal source language in an automatic way. It includes the process of identifying and tagging fixed language segments in an automatic way and the process of composing and tagging non-fixed language segments in an automatic way.

The Process of Identifying and Tagging Fixed Language Segments in an Automatic Way The process of identifying and tagging fixed language segments in an automatic way is as follows: A fixed language segment mode in a computer storage contains a fixed language segment and its meaning mark (fixed language segments of the same form and different meanings bearing meaning marks) and contains a grammatical attribute mark and a semantic attribute mark; in the process of identifying and tagging fixed language segments in an automatic way, a computer processor judges in turn whether there exists in the computer storage at least one fixed language segment beginning with the one writing unit at the forefront, whether there exists in the computer storage at least one fixed language segment beginning with the two writing units at the forefront, whether there exists in the computer storage at least one fixed language segment beginning with the three writing units at the forefront, and so on; if there exists in the computer storage at least one fixed language segment beginning with the n (a natural number, and the same below) writing unit(s) at the forefront and there does not exist in the computer storage at least one fixed language segment beginning with the n+1 writing units at the forefront, the computer processor identifies the rewriting unit(s) at the forefront as a fixed language segment, and then finds all the fixed language segment modes which can be used in the computer storage, chooses one of the fixed language segment modes in the choice order that a mode with a larger total number of use is prior to a mode with a smaller total number of use, and tags the fixed language segment with a meaning mark, a grammatical attribute mark and a semantic attribute mark according to the fixed language segment mode; if the computer processor finds out that there does not exist in the computer storage at least one fixed language segment beginning with the one writing unit at the forefront of the remaining language segment, the processor performs backtracking; the process is repeated until the last fixed language segment.

The computer processor corrects by backtracking the mistakes made in the process of identifying and tagging fixed language segments in an automatic way.

The following are examples of fixed language segment modes:

| methods[1] | data processing | automatic[1] |
|---|---|---|
| Nth | Naa | Aac |

The following are examples of identifying and tagging fixed language segments in an automatic way:
English

| methods[1] | relating to | data processing | performed[1] | by[2] | automatic[1] | means[1] |
|---|---|---|---|---|---|---|
| Nth | P | Naa | VTEDPAaa | P | Aac | Nob |

Chinese

| 计算机科学 | 是 | 研究[1] | 用[1] | 自动化 | ...... |
|---|---|---|---|---|---|
| Mww | LDzt | JDcw | JDcw | Xcx | |

Figure 4:
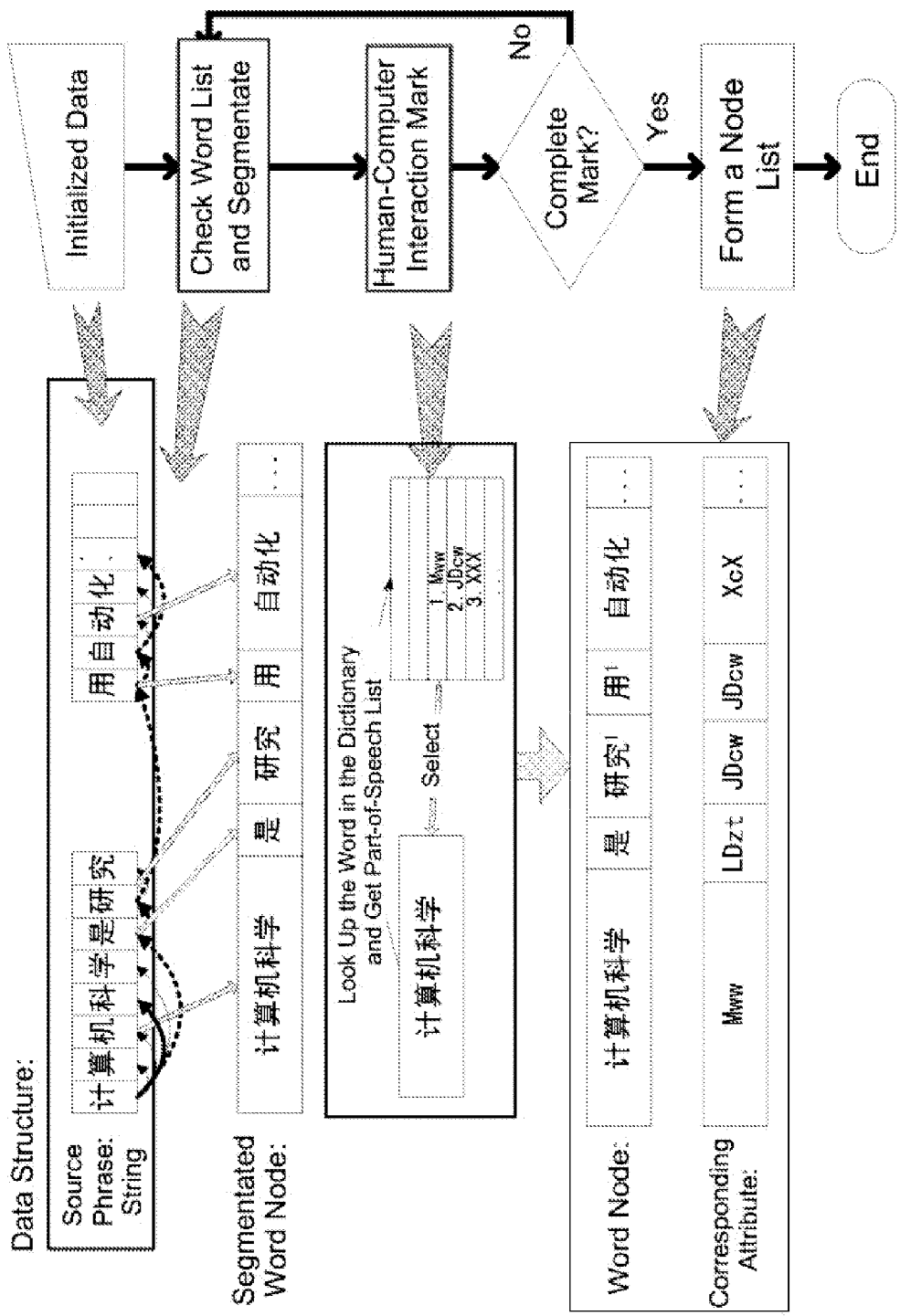
FIG. 4 is a block diagram showing the process of identifying and tagging fixed language segments in an automatic way.

The Computer Realization of Identifying and Tagging Fixed Language Segments in an Automatic Way FIG. 4 is a block diagram showing the process of identifying and tagging fixed language segments in an automatic way, wherein thin lines indicate the existence of the set phrases, heavy lines indicate no existence of the set phrases, and dashed lines indicate no existence of the set phrase which starts this way, as referring to FIG. 4.

Step 1: A processor obtains an initial language segment
计算机科学是研究 用自动化工 具完成数据处理的 方法的一门科学.

Step 2: The processor searches for at least one fixed language segment the first writing unit of which is 计. →YES (There exists in the computer storage at least one fixed language segment beginning with 计)→Among the fixed language segments the first writing unit of which is 计, the processor searches for at least one fixed language segment the second writing unit of which is 算. →YES (There exists in the computer storage at least one fixed language segment beginning with 计算)→Among the fixed language segments the first writing unit of which is 计 and the second writing unit of which is 算, the processor searches for at least one fixed language segment the third writing unit of which is 机. →YES (There exists in the computer storage at least one fixed language segment beginning with 计算机)→Among the fixed language segments the first writing unit of which is 计, the second writing unit of which is 算 and the third writing unit of which is 机, the processor searches for at least one fixed language segment the fourth writing unit of which is 科. →YES (There exists in the computer storage at least one fixed language segment beginning with 计算机科)→Among the fixed language segments the first writing unit of which is 计, the second writing unit of which is 算, the third writing unit of which is 机 and the fourth writing unit of which is 科, the processor searches for at least one fixed language segment the fifth writing unit of which is 学.→YES (There exists in the computer storage at least one fixed language segment beginning with 计算机科学.) → Among the fixed language segments the first writing unit of which is 计, the second writing unit of which is 算, the third writing unit of which is 机, the fourth writing unit of which is 科 and the fifth writing unit of which is 学, the processor searches for at least one fixed language segment the sixth writing unit of which is 是. →NO (There does not exist in the computer storage at least one fixed language segment beginning with 计算机科学是)→The computer processor identifies 计算机科学 as a fixed language segment.

Step 3: The processor finds out the mark group (meaning mark, grammatical attribute mark, semantic attribute mark) list of the set phrase "计算机科学", and marks the set phrase "计算机科学" with the mark group with the highest accumulative use times.

Step 4: The processor saves the set phrase and the mark group thereof (meaning mark, grammatical attribute mark, semantic attribute mark) in a node in the data list. If the computer processor finds out that there does not exist in the computer storage at least one fixed language segment beginning with the one writing unit at the forefront of the remaining language segment, the processor performs backtracking.

The process is repeated until the last fixed language segment.

The Process of Composing and Tagging Non-Fixed Language Segments in an Automatic Way The process of composing and tagging non-fixed language segments in an automatic way is as follows: A non-fixed language segment mode in a computer storage contains grammatical attribute marks and semantic attribute marks of the component segments and contains a combination mark, a key component mark, a relation mark, a grammatical attribute mark and a semantic attribute mark of the composed segment; in the process of composing and tagging non-fixed language segments in an automatic way, the computer processor finds all the non-fixed language segment modes which can be used in the computer storage, chooses one of the non-fixed language segment modes in the choice order that a mode with a larger total number of use is prior to a mode with a smaller total number of use, composes a non-fixed language segment and tags it with a key component mark, a relation mark, a grammatical attribute mark and a semantic attribute mark according to the non-fixed language segment mode; if the computer processor finds out that there does not exist a non-fixed language segment mode which can be used in the computer storage, the processor performs backtracking; the process is repeated until the non-fixed language segment constituted by the whole initial language segment.

By the backtracking in the process of composing and tagging non-fixed language segments in an automatic way, the computer processor corrects the mistakes made in the process of composing and tagging non-fixed language segments in an automatic way and the mistakes made in the process of identifying and tagging fixed language segments in an automatic way.

Some of the mistakes made in the process of identifying and tagging fixed language segments in an automatic way can be corrected only by the backtracking in the process of composing and tagging non-fixed language segments in an automatic way. The following are examples of non-fixed language segment mode:

```
    ...    relating to   ......          ...    ......
    Nth        P          Naa            Aac     Nob
    *_____              4   *
             Nth                         Nob
    ...      by²         ......          ...    ......
  VTEDPAaa    P           Nob            Naa   VTEDPAaa
  *_____              *  20
         VTEDPAaa                             Naa
```

Figure 5:
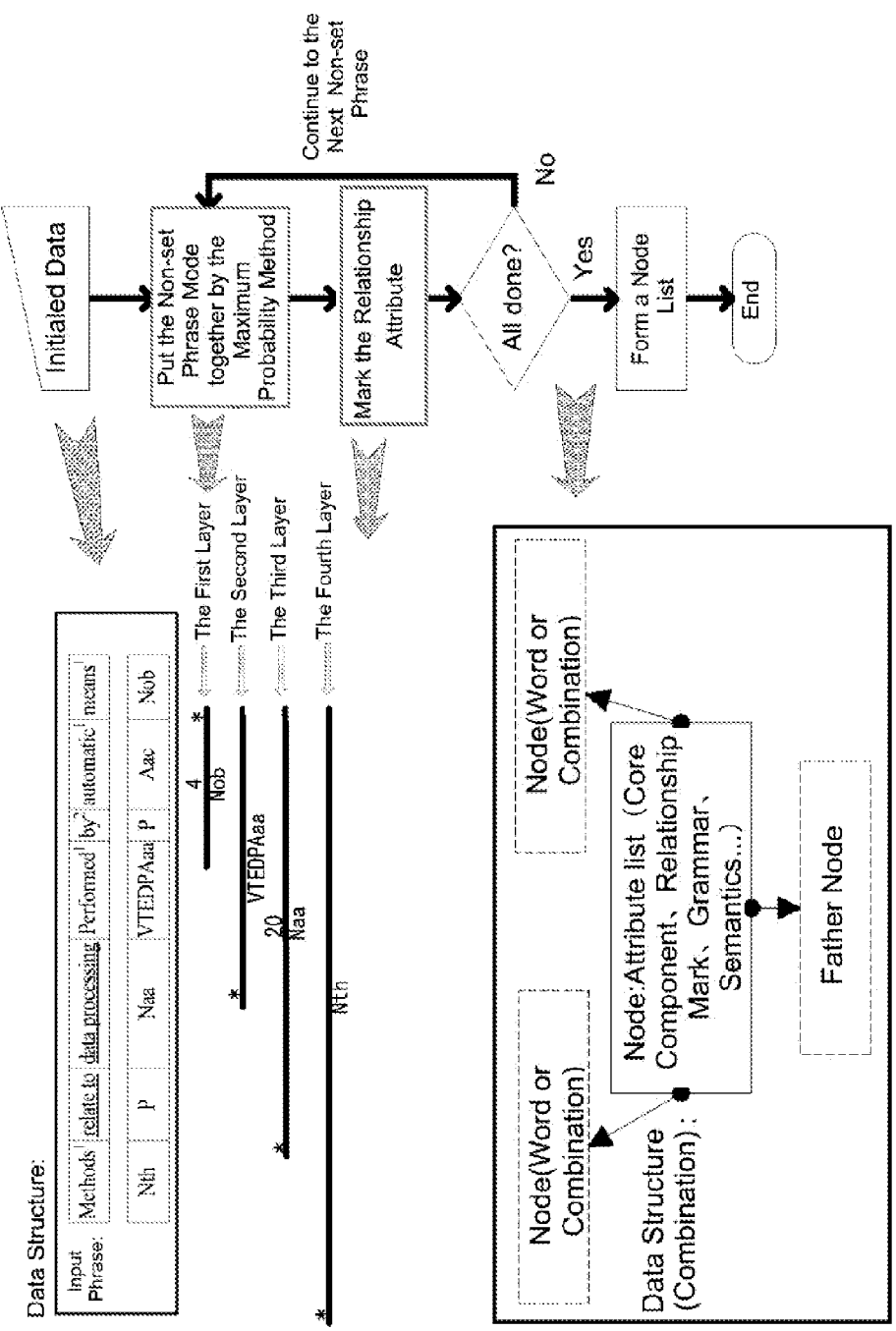
FIG. 5 is a block diagram showing the process of composing and tagging non-fixed language segments in an automatic way.

The following is an example of composing and tagging non-fixed language segments in an automatic way:

An Initial Language Segment methods[1] relating to data processing performed[1] by[2] automatic[1] means[1]
Nth         P          Naa        VTEDPAaa  P   Aac    Nob A Non-Fixed Language Segment at the First Level methods[1] <u>relating to data processing</u> performed[1] by[2] automatic[1] means[1]
Nth         P          Naa        VTEDPAaa  P   Aac    Nob
                                                4      *
                                               Nob A Non-Fixed Language Segment at the Second Level methods[1] <u>relating to data processing</u> performed[1] by[2] automatic[1] means[1]
Nth         P          Naa        VTEDPAaa  P   Aac    Nob
                                                4      *
                                               Nob
                                   *
                                VTEDPAaa A Non-Fixed Language Segment at the Third Level methods[1] <u>relating to data processing</u> performed[1] by[2] automatic[1] means[1]
Nth         P          Naa        VTEDPAaa  P   Aac    Nob
                                                4      *
                                               Nob
                                   *
                                VTEDPAaa
                        *   20
                            Naa A Non-Fixed Language Segment at the Fourth Level methods[1] <u>relating to data processing</u> performed[1] by[2] automatic[1] means[1]
Nth         P          Naa        VTEDPAaa  P   Aac    Nob
                                                4      *
                                               Nob
                                   *
                                VTEDPAaa
                        *   20
                            Naa
          *
        Nth The Computer Realization of Composing and Tagging Non-Fixed Language Segments in an Automatic Way FIG. 5 is a block diagram showing the process of composing and tagging non-fixed language segments in an automatic way.

Step 1: A computer processor finds all the non-fixed language segment modes which can be used in the computer storage, chooses one of the non-fixed language segment modes in the choice order that a mode with a larger total number of use is prior to a mode with a smaller total number of use, composes a non-fixed language segment and tags it with a key component mark, a relation mark, a grammatical attribute mark and a semantic attribute mark according to the non-fixed language segment mode.

Step 2: The computer processor saves the non-set phrase and the mark group thereof (core composition mark, relationship mark, grammatical attribute mark, semantic attribute mark) in a node in the data list and saves the quote of the composition phrase (Child node) and the quote of the combination phrase (Father node).

If the computer processor finds out that there does not exist a non-fixed language segment mode which can be used in the list of non-fixed language segment modes, the processor performs backtracking.

The process is repeated until the non-fixed language segment constituted by the whole initial language segment.

The second step of this preferred embodiment is exactly the same as the second step of the first preferred embodiment.

The Application of the Machine Translation from a Non-Formal Source Language into a Formal Target Language 1 The machine translation from a non-formal source language into a formal target language can be used in network terminal equipment. For example: A machine translation system from a non-formal source language into a formal target language for mobile phones. A is a user whose native language is Chinese and who knows nothing about English; B is a user whose native language is English and who knows nothing about Chinese. A puts non-formal Chinese into his/her mobile phone; A and his/her mobile phone formalize non-formal Chinese in an interactive way; his/her mobile phone transforms formal Chinese into formal English in an automatic way; his/her mobile phone sends formal English to B; B reads formal English on his/her mobile phone. B puts non-formal English into his/her mobile phone; B and his/her mobile phone formalize non-formal English in an interactive way; his/her mobile phone transforms formal English into formal Chinese in an automatic way; his/her mobile phone sends formal Chinese to A; A reads formal Chinese on his/her mobile phone. Users speaking different native languages can take part in absolutely accurate (no ambiguity) information exchange over the Internet in their respective native languages. The machine translation from a non-formal source language into a formal target language can not only eliminate the Internet language barriers but also promote the development of all kinds of languages.

2 The machine translation from a non-formal source language into a formal target language can be used in Internet knowledge bases and knowledge reasoning search engines. For example: In an Internet knowledge base, common knowledge and professional knowledge are represented comprehensively and fully in formal English. Abstracts of papers in non-formal English published on the Internet are formalized in an interactive way by authors and a knowledge reasoning search engine. Abstracts of papers in non-formal Chinese, Japanese, French, German, Russian, etc. published on the Internet are formalized in an interactive way by authors and a knowledge reasoning search engine and then formal Chinese, Japanese, French, German, Russian, etc. are transformed into formal English in an automatic way by the knowledge reasoning search engine. Abstracts of papers in formal English are stored in the Internet knowledge base. After a user puts forward a special subject, the knowledge reasoning search engine finds knowledge about the special subject in the Internet knowledge base and then extend, expand and restructure knowledge through reasoning, and output the results of the reasoning in formal English, enlightening the user so that he/she can make new discoveries and inventions. A knowledge reasoning search engine can transform results of reasoning in formal English into that in formal Chinese/Japanese/French/German/Russian, etc. in an automatic way according to the need of a user. A knowledge reasoning search engine can greatly speed up the development of science and technology. Humanity is at the primary stage of the information age characterized by Internet and search engines; Humanity will enter the higher stage of the information age characterized by Internet knowledge bases and knowledge reasoning search engines.

3 The machine translation from a non-formal source language into a formal target language can be used in expert systems. For example: In the knowledge base of an expert system, common knowledge and professional knowledge are represented comprehensively and fully in formal English. An expert whose native language is Chinese/Japanese/French/German/Russian puts knowledge into an expert system in non-formal Chinese/Japanese/French/German/Russian; The expert and the expert system formalize non-formal Chinese/Japanese/French/German/Russian in an interactive way; The expert system transforms formal Chinese/Japanese/French/German/Russian into formal English in an automatic way; The expert system puts knowledge represented in formal English into its knowledge base. A user whose native language is Chinese/Japanese/French/German/Russian puts a question in non-formal Chinese/Japanese/French/German/Russian into the expert system; The user and the expert system formalize non-formal Chinese/Japanese/French/German/Russian in an interactive way; The expert system transforms formal Chinese/Japanese/French/German/Russian into formal English in an automatic way; The expert system makes knowledge reasoning and outputs an answer in formal English. The expert system can transform an answer in formal English into that in formal Chinese/Japanese/French/German/Russian in an automatic way according to the need of a user.

4 The machine translation from a non-formal source language into a formal target language can be used in automatic programming. For example: A user whose native language is Chinese/Japanese/French/German/Russian puts a program designed in non-formal Chinese/Japanese/French/German/Russian into a computer; The user and the computer formalize non-formal Chinese/Japanese/French/German/Russian in an interactive way; The computer transforms formal Chinese/Japanese/French/German/Russian into formal English in an automatic way; The computer transforms formal English into a programming language in an automatic way.

The Third Preferred Embodiment of the Method of Machine Translation

This preferred embodiment is a method of machine translation for translating a non-formal source language into a non-formal target language, comprising the steps of: (a) formalizing a non-formal source language in an interactive way by first identifying one by one the fixed language segments of an initial language segment of a non-formal source language and tagging the fixed language segments with meaning marks until the last fixed language segment and then composing level by level the non-fixed language segments of the initial language segment and tagging the non-fixed language segments with key component marks and relation marks until the non-fixed language segment constituted by the whole initial language segment; (b) transforming the formal source language into a non-formal target language in an automatic way by first transforming in an automatic way the fixed language segments of the source language into language segments of the target language according to fixed language segment transformation rules and then transforming level by level in an automatic way the non-fixed language segments of the source language into language segments of the target language according to non-fixed language segment transformation rules.

Marks (See the first preferred embodiment of the method of machine translation.)

Substitution (See the first preferred embodiment of the method of machine translation.)

The first step of this preferred embodiment is exactly the same as the first step of the first preferred embodiment.

The process of transforming a formal source language into a non-formal target language in an automatic way The process of transforming a formal source language into a non-formal target language in an automatic way is as follows: A computer processor first transforms in an automatic way the fixed language segments of the source language into language segments of the target language according to fixed language segment transformation rules, and then transforms level by level in an automatic way the non-fixed language segments of the source language into language segments of the target language according to non-fixed language segment transformation rules. (A non-fixed language segment transformation rule is a rule which forms a non-fixed language segment of the target language with the translations of the components of the non-fixed language segment of a source language and a relation word of a target language according to the key component mark and the relation mark or relation word of the non-fixed language segment of a source language.)

The following is an example of the process of transforming a formal source language into a non-formal target language in an automatic way:

Non-Formal English methods relating to data processing performed by automatic means Formalizing the non-formal source language (English) in an interactive way:

Formal English

*methods¹ relating to data processing performed¹ by² automatic¹ means¹*

```
                                              4    *
                        *
                  *          20
*
```

Transforming in an automatic way the fixed language segments of the source language (English) into language segments of the target language (Chinese) according to fixed language segment transformation rules:

Fixed Language Segment Transformation Rules

| ENGLISH | CHINESE | FRENCH | GERMAN | JAPANESE |
|---|---|---|---|---|
| methods¹ | 方法 | ***** | ***** | ***** |
| relating to | 有关 ¹ | ***** | ***** | ***** |
| data processing | 数据处理 | ***** | ***** | ***** |
| performed¹ | 被执行 | ***** | ***** | ***** |
| by² | 被 ⁵ | ***** | ***** | ***** |
| automatic¹ | 自动 ³ | ***** | ***** | ***** |
| means¹ | 工具 ¹ | *** | * | *** | methods¹→ 方法 data processing→ 数据处理 performed¹→ 被执行 automatic¹→ 自动 ³ means¹→ 工具 ¹

Transforming level by level in an automatic way the non-fixed language segments of the source language (English) into language segments of the target language (Chinese) according to non-fixed language segment transformation rules:

Non-Fixed Language Segment Transformation Rules ( . . . , . . . are used as signs of English components; by², relating to are English relation words; * is a key component mark; 4, 1 are relation marks; → is used as a sign of transformation; ...ⁿ, ...ⁿ are used as signs of Chinese translations of English components; 的, 被⁵, 有关 ¹ are Chinese relation words.)

Rule I . . . 4 . . . *→ ...ⁿ 的 ...ⁿ

Rule II * . . . by² . . . → 被 ⁵ ...ⁿ ...ⁿ

Rule III * . . . 1 . . . → ...ⁿ 的 ...ⁿ

Rule IV * . . . relating to . . . → 有关 ¹ ...ⁿ 的 ...ⁿ

Transformation at the First Level automatic¹ means¹→ *automatic¹ⁿ* 的
*means¹ⁿ* → 自动 ³ 的 工具 ¹ (Rule I)

Transformation at the Second Level performed¹ by² automatic¹ means¹→ 被 ⁵ automatic¹
*means¹ⁿ performed¹ⁿ* → 被 ⁵ 自动 ³
的 工具 ¹ 被执行 (Rule II)

Transformation at the Third Level data processing performed¹ by² automatic¹
means¹→performed¹ by² automatic¹
*means¹ⁿ*的 *data processing*ⁿ → 被 ⁵
自动 ³ 的 工具 ¹ 被执行 的 数据处理 (Rule III)

Transformation at the Fourth Level methods¹ relating to data processing performed¹ by²
automatic¹ means¹→ 有关 ¹ data processing
performed¹ by² automatic¹ *means¹ⁿ* 的
*methods¹ⁿ* → 有关 ¹ 被 ⁵ 自动 ³
的 工具 ¹ 被执行 的 数据处理 的 方法 (Rule IV)

Non-Formal Chinese

有关 ¹ 被 ⁵ 自动 ³ 的 工具 ¹ 被执行 的 数据处理 的 方法

Figure 7:
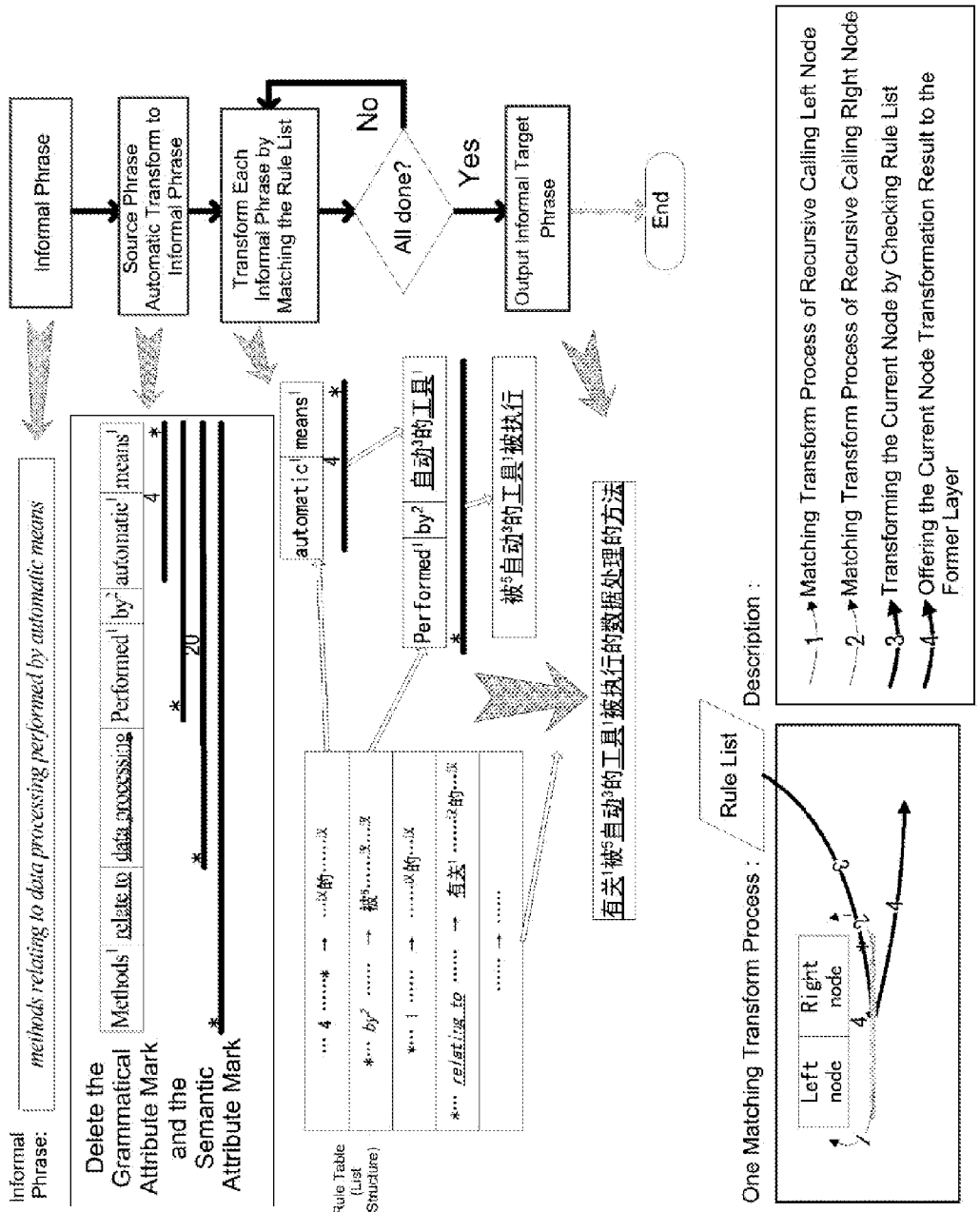
FIG. 7 is a block diagram showing the process of transforming a formal source language into a non-formal target language in an automatic way.

The Computer Realization of Transforming a Formal Source Language into a Non-Formal Target Language in an Automatic Way FIG. 7 is a block diagram showing the process of transforming a formal source language into a non-formal target language in an automatic way.

Step 1: A computer processor searches a list of fixed language segment transformation rules for matching fixed language segment transformation rules and transforms fixed language segments of the source language into fixed or non-fixed language segments of the target language according to the matching fixed language segment transformation rules.

Step 2: The computer processor searches a list of non-fixed language segment transformation rules for a matching non-fixed language segment transformation rule, transforms a non-fixed language segment of the source language into a non-fixed language segment of the target language according to the matching non-fixed language segment transformation rule, repeating the step recursively until all the non-fixed language segments are transformed level by level, in which process, concerning the current non-fixed language segment of the source language, first, all the components of the current non-fixed language segment are transformed into the target language respectively, and then, the current non-fixed language segment is transformed into the target language according to the matching non-fixed language segment transformation rule, the result of the transformation of the current non-fixed language segment being returned to be used by the non-fixed language segment at the higher level, until the non-fixed language segment as the initial data is transformed into the target language.

Step 3: The computer outputs the non-formal target language.

The fourth preferred embodiment of the method of machine translation

This preferred embodiment is a method of machine translation for translating a non-formal source language into a non-formal target language, comprising the steps of: (a) formalizing a non-formal source language in an automatic way by first identifying one by one the fixed language segments of an initial language segment of a non-formal source language and tagging the fixed language segments with meaning marks until the last fixed language segment and then composing level by level the non-fixed language segments of the initial language segment and tagging the non-fixed language segments with key component marks and relation marks until the non-fixed language segment constituted by the whole initial language segment; (b) transforming the formal source language into a non-formal target language in an automatic way by first transforming in an automatic way the fixed language segments of the source language into language segments of the target language according to fixed language segment transformation rules and then transforming level by level in an automatic way the non-fixed language segments of the source language into language segments of the target language according to non-fixed language segment transformation rules.

Marks (See the first preferred embodiment of the method of machine translation.)

Substitution (See the first preferred embodiment of the method of machine translation.)

The first step of this preferred embodiment is exactly the same as the first step of the second preferred embodiment.

The second step of this preferred embodiment is exactly the same as the second step of the third preferred embodiment.

The Application of the Machine Translation from a Non-Formal Source Language into a Non-Formal Target Language The machine translation from a non-formal source language into a non-formal target language can be used in network terminal equipment. For example: A machine translation system from a non-formal source language into a non-formal target language for mobile phones. A is a user whose native language is Chinese and who knows nothing about English; B is a user whose native language is English and who knows nothing about Chinese. A puts non-formal Chinese into his/her mobile phone; A and his/her mobile phone formalize non-formal Chinese in an interactive way; his/her mobile phone transforms formal Chinese into non-formal English in an automatic way; his/her mobile phone sends non-formal English to B; B reads non-formal English on his/her mobile phone. B puts non-formal English into his/her mobile phone; B and his/her mobile phone formalize non-formal English in an interactive way; his/her mobile phone transforms formal English into non-formal Chinese in an automatic way; his/her mobile phone sends non-formal Chinese to A; A reads non-formal Chinese on his/her mobile phone. A user can translate his/her native language correctly and without any lexical ambiguity into any foreign language which he/she knows nothing about. Users speaking different native languages can take part in accurate information exchange over the Internet in their respective native languages.

The First Preferred Embodiment of the System of Machine Translation

Figure 8:
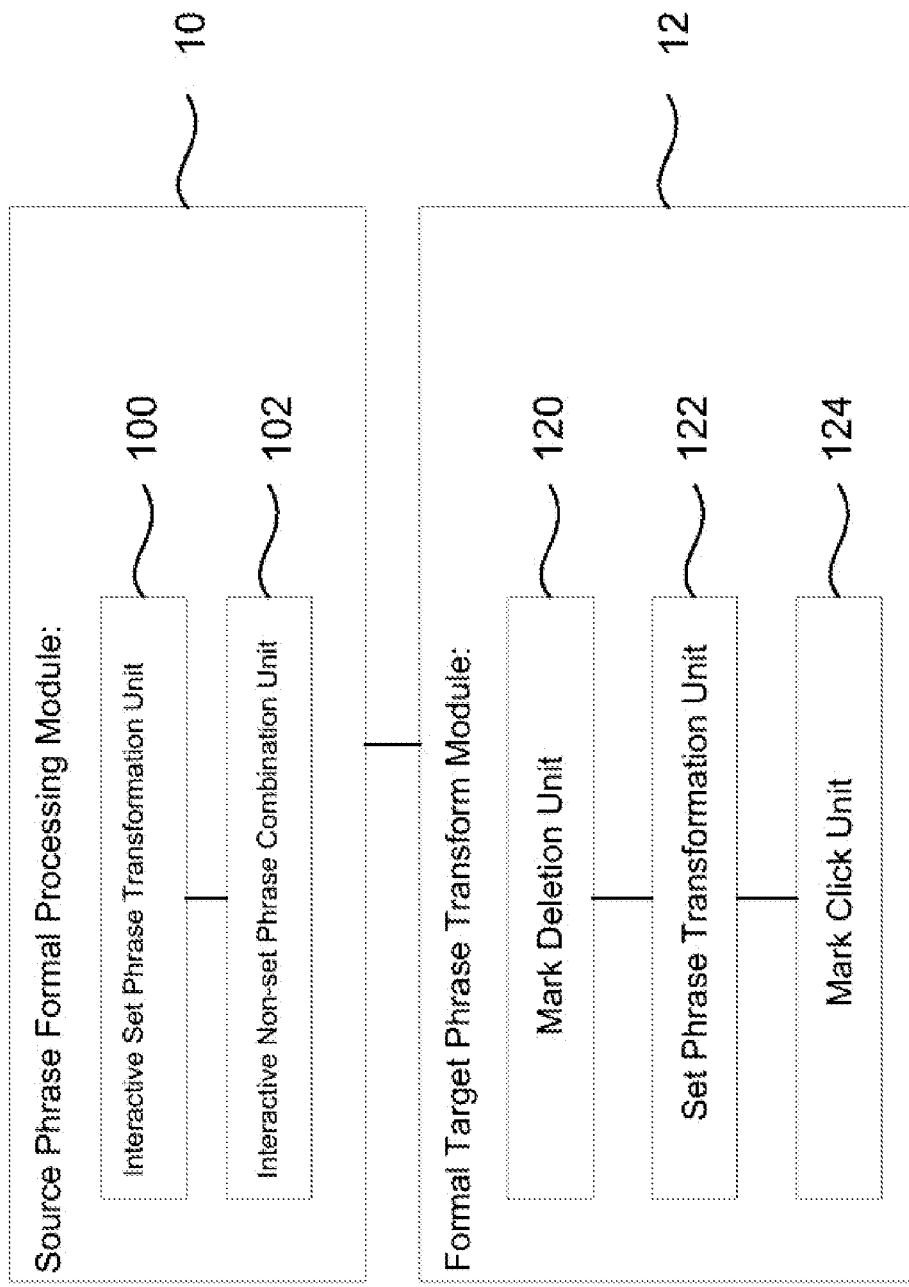
FIG. 8 is a block diagram showing the first preferred embodiment of the system of machine translation.

FIG. 8 is a block diagram showing the first preferred embodiment of the system of machine translation.

This preferred embodiment is a system of machine translation for translating a non-formal source language into a formal target language, comprising: (a) source language formalization module 10 for formalizing a non-formal source language in an interactive way by first identifying one by one the fixed language segments of an initial language segment of a non-formal source language and tagging the fixed language segments with meaning marks until the last fixed language segment and then composing level by level the non-fixed language segments of the initial language segment and tagging the non-fixed language segments with key component marks and relation marks until the non-fixed language segment constituted by the whole initial language segment; (b) target language transformation module 12 connected to source language formalization module 10 before it for transforming the formal source language into a formal target language in an automatic way by transforming in an automatic way the fixed language segments of the source language into language segments of the target language according to fixed language segment transformation rules.

It is preferable for the system to include a substitution module connected to source language formalization module 10 after it for pre-processing by means of substitution marks before formalizing a non-formal source language in an interactive way, i.e. separating an initial language segment into a number of sub-segments by means of substitution marks in advance, and then formalizing the sub-segments respectively. Source language formalization module 10 for formalizing a non-formal source language in an interactive way includes unit 100 for identifying one by one the fixed language segments of an initial language segment of a non-formal source language and tagging the fixed language segments with meaning marks until the last fixed language segment and unit 102 connected to unit 100 before it for composing level by level the non-fixed language segments of the initial language segment and tagging the non-fixed language segments with key component marks and relation marks until the non-fixed language segment constituted by the whole initial language segment.

The following is how unit 100 identifies and tags fixed language segments: A fixed language segment mode of a source language formalization module contains a fixed language segment and its meaning mark (fixed language segments of the same form and different meanings bearing meaning marks); in the process of identifying and tagging fixed language segments in an interactive way, a computer processor judges in turn whether there exists in the computer storage at least one fixed language segment beginning with the one writing unit at the forefront, whether there exists in the computer storage at least one fixed language segment beginning with the two writing units at the forefront, whether there exists in the computer storage at least one fixed language segment beginning with the three writing units at the forefront, and so on; if there exists in the computer storage at least one fixed language segment beginning with the n (a natural number, and the same below) writing unit(s) at the forefront and there does not exist in the computer storage at least one fixed language segment beginning with the n+1 writing units at the forefront, the computer processor identifies the n writing unit(s) at the forefront as a fixed language segment and tags it with a meaning mark according to a fixed language segment mode, and after that a user confirms or revises the mark; if the computer processor finds out that there does not exist in the computer storage at least one fixed language segment beginning with the one writing unit at the forefront of the remaining language segment, the user identifies the fixed language segment beginning with the one writing unit at the forefront of the remaining language segment and tags it with a meaning mark; the process is repeated until the last fixed language segment.

The following is how unit 102 composes and tags non-fixed language segments: In an interactive way, the computer processor and the user compose level by level the non-fixed language segments of the initial language segment and tag the non-fixed language segments with key component marks and relation marks until the non-fixed language segment constituted by the whole initial language segment.

Target language transformation module 12 for transforming a formal source language into a formal target language in an automatic way includes unit 122 which searches a list of fixed language segment transformation rules for matching fixed language segment transformation rules and transforms fixed language segments of the source language into fixed or non-fixed language segments of the target language according to the matching fixed language segment transformation rules and unit 124 which displays the meaning represented by a meaning mark of a fixed language segment of the target language after a user clicks on the meaning mark and displays the relation represented by a relation mark after a user clicks on the relation mark.

The Second Preferred Embodiment of the System of Machine Translation

Figure 9:
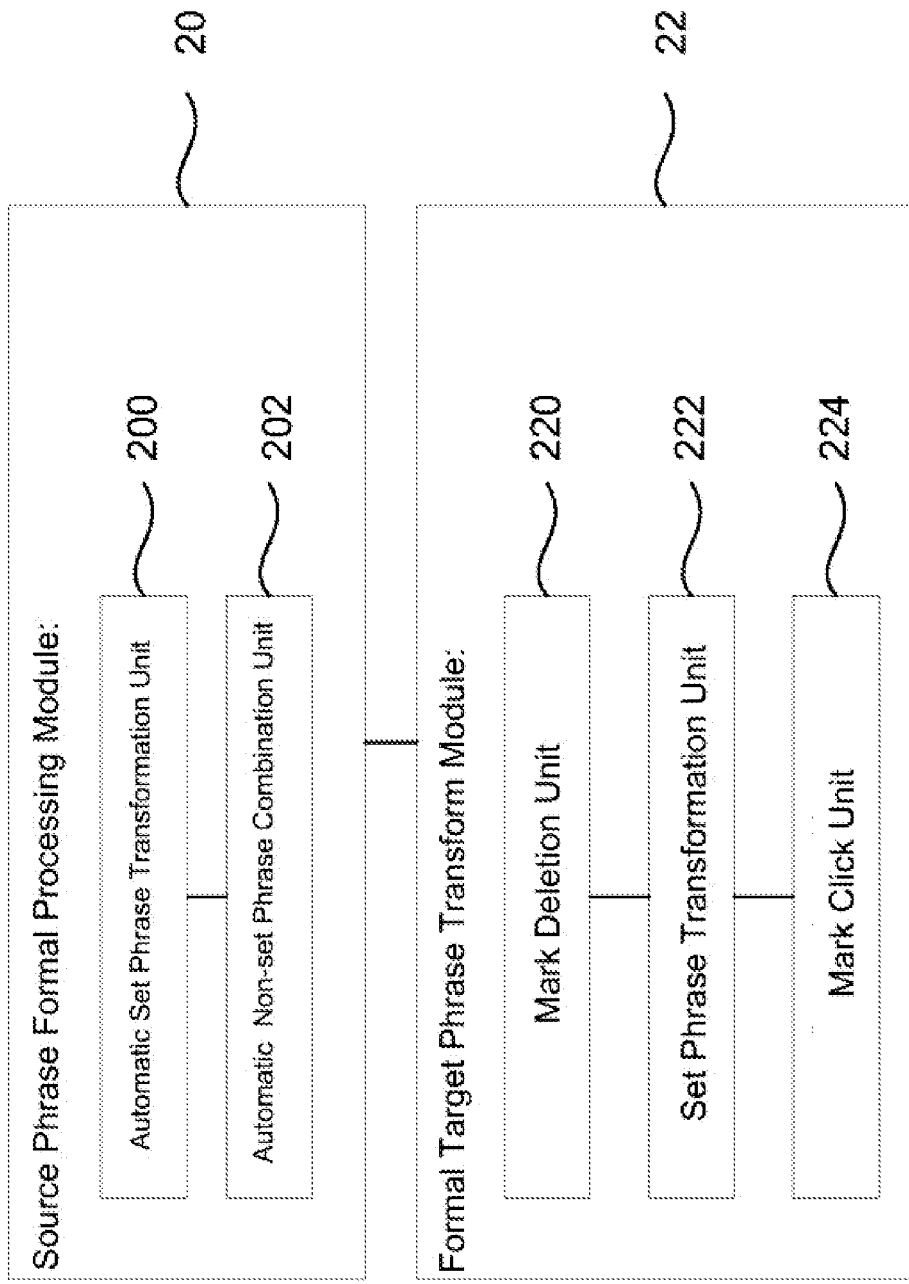
FIG. 9 is a block diagram showing the second preferred embodiment of the system of machine translation.

FIG. 9 is a block diagram showing the second preferred embodiment of the system of machine translation.

This preferred embodiment is a system of machine translation for translating a non-formal source language into a formal target language, comprising: (a) source language formalization module 20 for formalizing a non-formal source language in an automatic way by first identifying one by one the fixed language segments of an initial language segment of a non-formal source language and tagging the fixed language segments with meaning marks until the last fixed language segment and then composing level by level the non-fixed language segments of the initial language segment and tagging the non-fixed language segments with key component marks and relation marks until the non-fixed language segment constituted by the whole initial language segment; (b) target language transformation module 22 connected to source language formalization module 20 before it for transforming the formal source language into a formal target language in an automatic way by transforming in an automatic way the fixed language segments of the source language into language segments of the target language according to fixed language segment transformation rules.

Source language formalization module 20 for formalizing a non-formal source language in an automatic way includes unit 200 for identifying one by one the fixed language segments of an initial language segment of a non-formal source language and tagging the fixed language segments with meaning marks until the last fixed language segment and unit 202 connected to unit 200 before it for composing level by level the non-fixed language segments of the initial language segment and tagging the non-fixed language segments with key component marks and relation marks until the non-fixed language segment constituted by the whole initial language segment.

The following is how unit 200 identifies and tags fixed language segments: A fixed language segment mode in a computer storage contains a fixed language segment and its meaning mark (fixed language segments of the same form and different meanings bearing meaning marks) and contains a grammatical attribute mark and a semantic attribute mark; in the process of identifying and tagging fixed language segments in an automatic way, a computer processor judges in turn whether there exists in the computer storage at least one fixed language segment beginning with the one writing unit at the forefront, whether there exists in the computer storage at least one fixed language segment beginning with the two writing units at the forefront, whether there exists in the computer storage at least one fixed language segment beginning with the three writing units at the forefront, and so on; if there exists in the computer storage at least one fixed language segment beginning with the n (a natural number, and the same below) writing unit(s) at the forefront and there does not exist in the computer storage at least one fixed language segment beginning with the n+1 writing units at the forefront, the computer processor identifies the n writing unit(s) at the forefront as a fixed language segment, and then finds all the fixed language segment modes which can be used in the computer storage, chooses one of the fixed language segment modes in the choice order that a mode with a larger total number of use is prior to a mode with a smaller total number of use, and tags the fixed language segment with a meaning mark, a grammatical attribute mark and a semantic attribute mark according to the fixed language segment mode; if the computer processor finds out that there does not exist in the computer storage at least one fixed language segment beginning with the one writing unit at the forefront of the remaining language segment, the processor performs backtracking; the process is repeated until the last fixed language segment. The following is how unit 202 composes and tags non-fixed language segments: A non-fixed language segment mode in a computer storage contains grammatical attribute marks and semantic attribute marks of the component segments and contains a combination mark, a key component mark, a relation mark, a grammatical attribute mark and a semantic attribute mark of the composed segment; in the process of composing and tagging non-fixed language segments in an automatic way, the computer processor finds all the non-fixed language segment modes which can be used in the computer storage, chooses one of the non-fixed language segment modes in the choice order that a mode with a larger total number of use is prior to a mode with a smaller total number of use, composes a non-fixed language segment and tags it with a key component mark, a relation mark, a grammatical attribute mark and a semantic attribute mark according to the non-fixed language segment mode; if the computer processor finds out that there does not exist a non-fixed language segment mode which can be used in the computer storage, the processor performs backtracking; the process is repeated until the non-fixed language segment constituted by the whole initial language segment.

Target language transformation module 22 for transforming the formal source language into a formal target language in an automatic way includes unit 222 which searches a list of fixed language segment transformation rules for matching fixed language segment transformation rules and transforms fixed language segments of the source language into fixed or non-fixed language segments of the target language according to the matching fixed language segment transformation rules and unit 224 which displays the meaning represented by a meaning mark of a fixed language segment of the target language after the user clicks on the meaning mark and displays the relation represented by a relation mark after the user clicks on the relation mark.

The Third Preferred Embodiment of the System of Machine Translation

Figure 10:
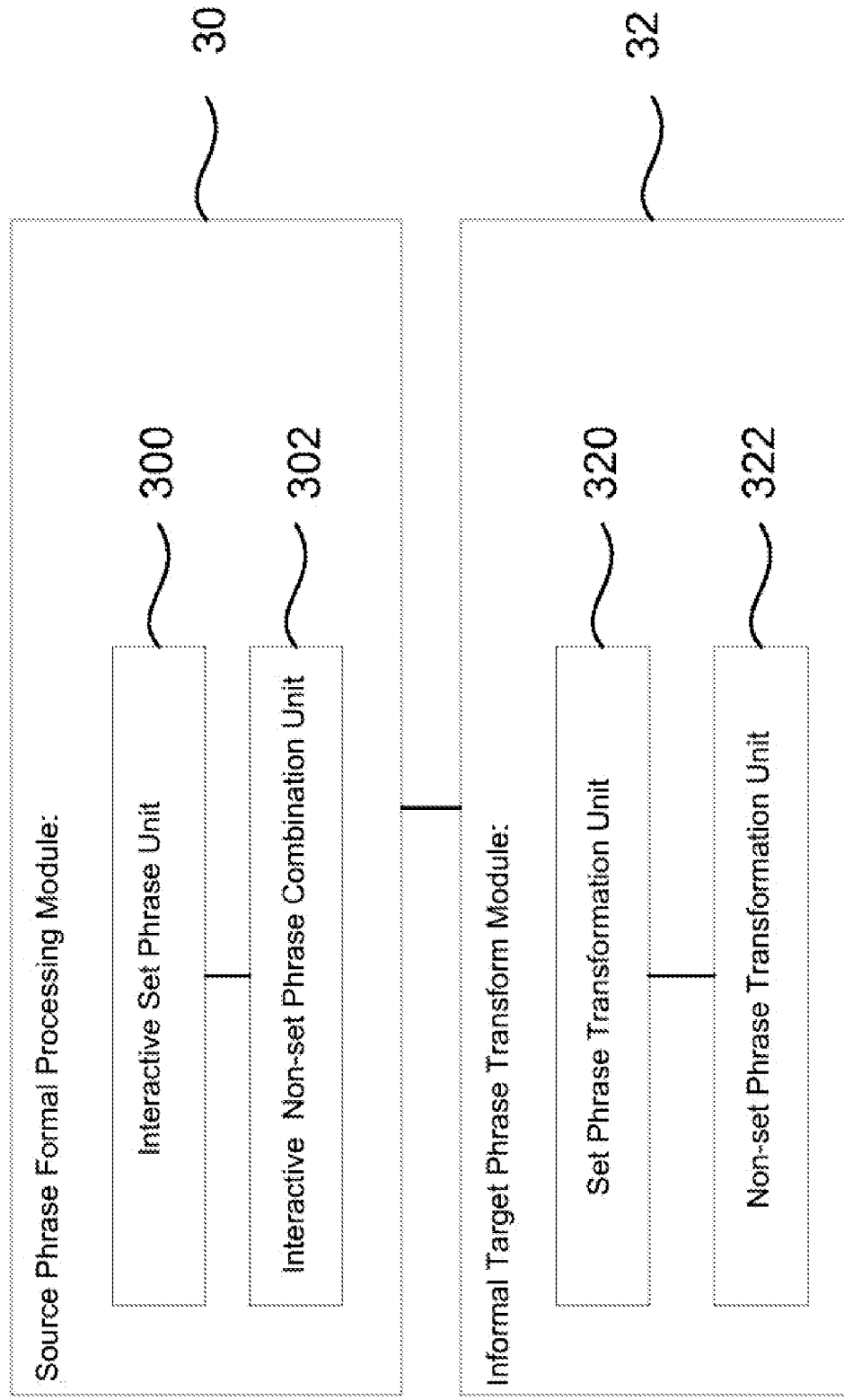
FIG. 10 is a block diagram showing the third preferred embodiment of the system of machine translation.

FIG. 10 is a block diagram showing the third preferred embodiment of the system of machine translation.

This preferred embodiment is a system of machine translation for translating a non-formal source language into a non-formal target language, comprising: (a) source language formalization module 30 for formalizing a non-formal source language in an interactive way by first identifying one by one the fixed language segments of an initial language segment of a non-formal source language and tagging the fixed language segments with meaning marks until the last fixed language segment and then composing level by level the non-fixed language segments of the initial language segment and tagging the non-fixed language segments with key component marks and relation marks until the non-fixed language segment constituted by the whole initial language segment; (b) target language transformation module 32 connected to source language formalization module 30 before it for transforming the formal source language into a non-formal target language in an automatic way by first transforming in an automatic way the fixed language segments of the source language into language segments of the target language according to fixed language segment transformation rules and then transforming level by level in an automatic way the non-fixed language segments of the source language into language segments of the target language according to non-fixed language segment transformation rules.

It is preferable for the system to include a substitution module connected to source language formalization module 30 after it for pre-processing by means of substitution marks before formalizing a non-formal source language in an interactive way, i.e. separating an initial language segment into a number of sub-segments by means of substitution marks in advance, and then formalizing the sub-segments respectively. Source language formalization module 30 for formalizing a non-formal source language in an interactive way includes unit 300 for identifying one by one the fixed language segments of an initial language segment of a non-formal source language and tagging the fixed language segments with meaning marks until the last fixed language segment and unit 302 connected to unit 300 before it for composing level by level the non-fixed language segments of the initial language segment and tagging the non-fixed language segments with key component marks and relation marks until the non-fixed language segment constituted by the whole initial language segment.

The following is how unit 300 identifies and tags fixed language segments: A fixed language segment mode of a source language formalization module contains a fixed language segment and its meaning mark (fixed language segments of the same form and different meanings bearing meaning marks); in the process of identifying and tagging fixed language segments in an interactive way, the computer processor judges in turn whether there exists in the computer storage at least one fixed language segment beginning with the one writing unit at the forefront, whether there exists in the computer storage at least one fixed language segment beginning with the two writing units at the forefront, whether there exists in the computer storage at least one fixed language segment beginning with the three writing units at the forefront, and so on; if there exists in the computer storage at least one fixed language segment beginning with the n (a natural number, and the same below) writing unit(s) at the forefront and there does not exist in the computer storage at least one fixed language segment beginning with the n+1 writing units at the forefront, the computer processor identifies the n writing unit(s) at the forefront as a fixed language segment and tags it with a meaning mark according to a fixed language segment mode, and after that the user confirms or revises the mark; if the computer processor finds out that there does not exist in the computer storage at least one fixed language segment beginning with the one writing unit at the forefront of the remaining language segment, the user identifies the fixed language segment beginning with the one writing unit at the forefront of the remaining language segment and tags it with a meaning mark; the process is repeated until the last fixed language segment.

The following is how unit 302 composes and tags non-fixed language segments: In an interactive way, the computer processor and the user compose level by level the non-fixed language segments of the initial language segment and tag the non-fixed language segments with key component marks and relation marks until the non-fixed language segment constituted by the whole initial language segment.

Target language transformation module 32 for transforming the formal source language into a non-formal target language in an automatic way includes unit 320 which searches the list of fixed language segment transformation rules for matching fixed language segment transformation rules and transforms fixed language segments of the source language into fixed or non-fixed language segments of the target language according to the matching fixed language segment transformation rules and unit 322 connected to unit 320 before it which searches the list of non-fixed language segment transformation rules for a matching non-fixed language segment transformation rule, transforms a non-fixed language segment of the source language into a non-fixed language segment of the target language according to the matching non-fixed language segment transformation rule, repeating the step recursively until all the non-fixed language segments are transformed level by level, in which process, concerning the current non-fixed language segment of the source language, first, all the components of the current non-fixed language segment are transformed into the target language respectively, and then, the current non-fixed language segment is transformed into the target language according to the matching non-fixed language segment transformation rule, the result of the transformation of the current non-fixed language segment being returned to be used by the non-fixed language segment at the higher level, until the non-fixed language segment as the initial data is transformed into the target language.

The Fourth Preferred Embodiment of the System of Machine Translation

Figure 11:
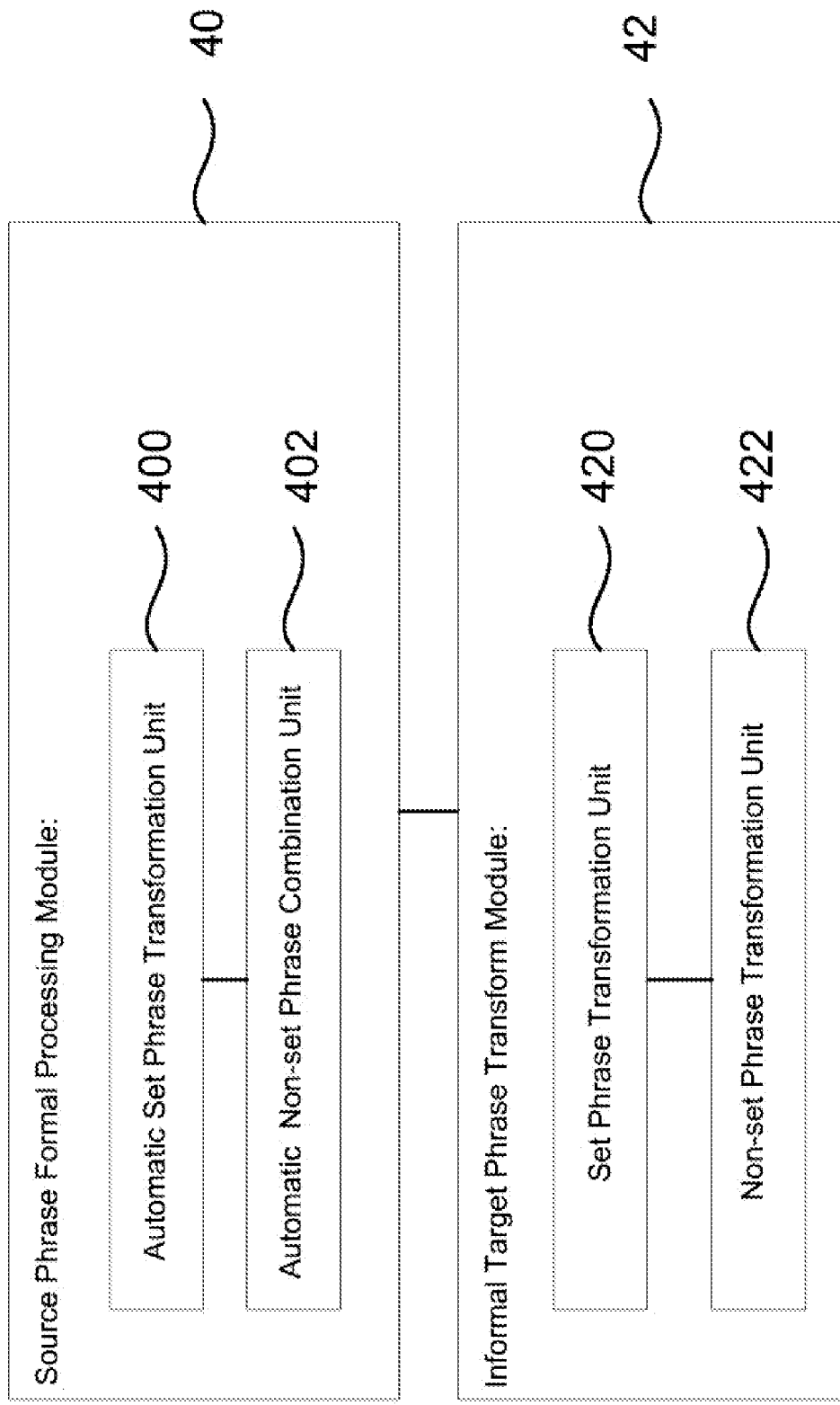
FIG. 11 is a block diagram showing the fourth preferred embodiment of the system of machine translation.

FIG. 11 is a block diagram showing the fourth preferred embodiment of the system of machine translation.

This preferred embodiment is a system of machine translation for translating a non-formal source language into a non-formal target language, comprising: (a) source language formalization module 40 for formalizing a non-formal source language in an automatic way by first identifying one by one the fixed language segments of an initial language segment of a non-formal source language and tagging the fixed language segments with meaning marks until the last fixed language segment and then composing level by level the non-fixed language segments of the initial language segment and tagging the non-fixed language segments with key component marks and relation marks until the non-fixed language segment constituted by the whole initial language segment; (b) target language transformation module 42 connected to source language formalization module 40 before it for transforming the formal source language into a non-formal target language in an automatic way by first transforming in an automatic way the fixed language segments of the source language into language segments of the target language according to fixed language segment transformation rules and then transforming level by level in an automatic way the non-fixed language segments of the source language into language segments of the target language according to non-fixed language segment transformation rules.

Source language formalization module 40 for formalizing a non-formal source language in an automatic way includes unit 400 for identifying one by one the fixed language segments of an initial language segment of a non-formal source language and tagging the fixed language segments with meaning marks until the last fixed language segment and unit 402 connected to unit 400 before it for composing level by level the non-fixed language segments of the initial language segment and tagging the non-fixed language segments with key component marks and relation marks until the non-fixed language segment constituted by the whole initial language segment.

The following is how unit 400 identifies and tags fixed language segments: A fixed language segment mode of a source language formalization module contains a fixed language segment and its meaning mark (fixed language segments of the same form and different meanings bearing meaning marks) and contains a grammatical attribute mark and a semantic attribute mark; in the process of identifying and tagging fixed language segments in an automatic way, the computer processor judges in turn whether there exists in the computer storage at least one fixed language segment beginning with the one writing unit at the forefront, whether there exists in the computer storage at least one fixed language segment beginning with the two writing units at the forefront, whether there exists in the computer storage at least one fixed language segment beginning with the three writing units at the forefront, and so on; if there exists in the computer storage at least one fixed language segment beginning with the n (a natural number, and the same below) writing unit(s) at the forefront and there does not exist in the computer storage at least one fixed language segment beginning with the n+1 writing units at the forefront, the computer processor identifies the n writing unit(s) at the forefront as a fixed language segment, and then finds all the fixed language segment modes which can be used in the computer storage, chooses one of the fixed language segment modes in the choice order that a mode with a larger total number of use is prior to a mode with a smaller total number of use, and tags the fixed language segment with a meaning mark, a grammatical attribute mark and a semantic attribute mark according to the fixed language segment mode; if the computer processor finds out that there does not exist in the computer storage at least one fixed language segment beginning with the one writing unit at the forefront of the remaining language segment, the processor performs backtracking; the process is repeated until the last fixed language segment.

The following is how unit 402 composes and tags non-fixed language segments: A non-fixed language segment mode of a source language formalization module contains grammatical attribute marks and semantic attribute marks of the component segments and contains a combination mark, a key component mark, a relation mark, a grammatical attribute mark and a semantic attribute mark of the composed segment; in the process of composing and tagging non-fixed language segments in an automatic way, the computer processor finds all the non-fixed language segment modes which can be used in the computer storage, chooses one of the non-fixed language segment modes in the choice order that a mode with a larger total number of use is prior to a mode with a smaller total number of use, composes a non-fixed language segment and tags it with a key component mark, a relation mark, a grammatical attribute mark and a semantic attribute mark according to the non-fixed language segment mode; if the computer processor finds out that there does not exist a non-fixed language segment mode which can be used in the computer storage, the processor performs backtracking; the process is repeated until the non-fixed language segment constituted by the whole initial language segment.

Target language transformation module 42 for transforming the formal source language into a non-formal target language in an automatic way includes unit 420 which searches the list of fixed language segment transformation rules for matching fixed language segment transformation rules and transforms fixed language segments of the source language into fixed or non-fixed language segments of the target language according to the matching fixed language segment transformation rules and unit 422 connected to unit 420 before it which searches the list of non-fixed language segment transformation rules for a matching non-fixed language segment transformation rule, transforms a non-fixed language segment of the source language into a non-fixed language segment of the target language according to the matching non-fixed language segment transformation rule, repeating the step recursively until all the non-fixed language segments are transformed level by level, in which process, concerning the current non-fixed language segment of the source language, first, all the components of the current non-fixed language segment are transformed into the target language respectively, and then, the current non-fixed language segment is transformed into the target language according to the matching non-fixed language segment transformation rule, the result of the transformation of the current non-fixed language segment being returned to be used by the non-fixed language segment at the higher level, until the non-fixed language segment as the initial data is transformed into the target language.

The Implementation of the Invention

Although the novel and improved machine translation method and system according to the preferred embodiments of the present invention has been described, the present invention is not restricted to such examples. It is evident to those skilled in the art that the present invention may be modified or changed within a technical philosophy thereof and it is understood that naturally these belong to the technical philosophy of the present invention.

What is claimed is:

1. A method of machine translation comprising steps of: a) formalizing a non-formal source language by a computer processor; and b) transforming a formal source language into a target language; wherein the non-formal source language is formalized in an interactive way or an automatic way; the target language is a formal target language or a non-formal target language; the step a) comprises steps of: identifying one by one fixed language segments of an initial language segment of the non-formal source language and tagging the fixed language segments with meaning marks until the last fixed language segment and then composing level by level non-fixed language segments of the initial language segment and tagging the non-fixed language segments with key component marks and relation marks until the non-fixed language segment constituted by the whole initial language segment with the computer processor; for transforming the formal source language into the formal target language, the step b) comprises a step of transforming in the automatic way the fixed language segments of the source language into language segments of the target language according to fixed language segment transformation rules stored in a computer memory; for transforming the formal source language into the non-formal target language, the step b) comprises steps of transforming in the automatic way the fixed language segments of the source language into language segments of the target language according to the fixed language segment transformation rules stored in the computer memory and then transforming level by level in the automatic way the non-fixed language segments of the source language into language segments of the target language according to non-fixed language segment transformation rules stored in the computer memory.

2. The method of machine translation according to claim 1, wherein: the step a) further comprises a step of pre-processing by means of substitution marks, which specifically comprises steps of: using the computer processor for separating an initial language segment into a number of sub-segments by means of substitution marks in advance, and then formalizing the sub-segments respectively.

3. The method of machine translation according to claim 1, wherein: a fixed language segment mode stored in the computer memory contains a fixed language segment and its meaning mark, fixed language segments of the same form and different meanings bearing meaning marks;

in the process of identifying and tagging the fixed language segments in the interactive way, the computer processor judges in turn whether there exists in the computer memory at least one fixed language segment beginning with the one writing unit at the forefront, whether there exists in the computer memory at least one fixed language segment beginning with the two writing units at the forefront, whether there exists in the computer memory at least one fixed language segment beginning with the three writing units at the forefront, and so on; wherein n is a natural number, if there exists in the computer memory at least one fixed language segment beginning with the n writing unit or units at the forefront and there does not exist in the computer memory at least one fixed language segment beginning with the n+1 writing units at the forefront, the computer processor identifies the n writing unit or units at the forefront as a first fixed language segment of the fixed language segments and tags it with a first meaning mark of the meaning marks according to a fixed language segment mode, and after that a user confirms or revises the mark; if the computer processor finds out that there does not exist in the computer memory at least one fixed language segment beginning with the one writing unit at the forefront of a remaining language segment, the user identifies the fixed language segment beginning with the one writing unit at the forefront of the remaining language segment and tags it with the first meaning mark; the process is repeated until the last fixed language segment.

4. The method of machine translation according to claim 1, wherein: a fixed language segment mode stored in the computer memory contains a fixed language segment and its meaning mark, fixed language segments of the same form and different meanings bearing meaning marks, and contains a grammatical attribute mark and a semantic attribute mark; in the process of identifying and tagging fixed language segments in the automatic way, the computer processor judges in turn whether there exists in the computer memory at least one fixed language segment beginning with the one writing unit at the forefront, whether there exists in the computer memory at least one fixed language segment beginning with the two writing units at the forefront, whether there exists in the computer memory at least one fixed language segment beginning with the three writing units at the forefront, and so on; wherein n is a natural number, if there exists in the computer memory at least one fixed language segment beginning with the n writing unit or units at the forefront and there does not exist in the computer memory at least one fixed language segment beginning with the n+1 writing units at the forefront, the computer processor identifies the n writing unit or units at the forefront as a first fixed language segment of the fixed language segments, and then finds all the fixed language segment modes which can be used in the computer memory, chooses one of the fixed language segment modes in the choice order that a mode with a larger total number of use is prior to a mode with a smaller total number of use, and tags the fixed language segment with a first meaning mark of the meaning marks, a grammatical attribute mark and a semantic attribute mark according to the fixed language segment mode; if the computer processor finds out that there does not exist in the computer memory at least one fixed language segment beginning with the one writing unit at the forefront of a remaining language segment, the computer processor performs backtracking; the process is repeated until the last fixed language segment.

5. The method of machine translation according to claim 1, wherein: a non-fixed language segment mode stored in the computer memory contains grammatical attribute marks and semantic attribute marks of component segments and contains a combination mark, a key component mark, a relation mark, a grammatical attribute mark and a semantic attribute mark of a composed segment; in the process of composing and tagging non-fixed language segments in the automatic way, the computer processor finds all the non-fixed language segment modes which can be used in the computer memory, chooses one of the non-fixed language segment modes in the choice order that a mode with a larger total number of use is prior to a mode with a smaller total number of use, composes a non-fixed language segment and tags it with a key component mark, a relation mark, a grammatical attribute mark and a semantic attribute mark according to the non-fixed language segment mode; if the computer processor finds out that there does not exist a at least one non-fixed language segment mode which can be used in the computer memory, the computer processor performs backtracking; the process is repeated until the non-fixed language segment constituted by the whole initial language segment.

6. The method of machine translation according to claim 1, further comprising steps of: c) after a user clicks on a meaning mark, using a screen for displaying a meaning represented by the meaning mark, and, d) after the user clicks on a relation mark, using the screen for displaying a relation represented by the relation mark.

7. The method of machine translation according to claim 1, wherein: the non-fixed language segment transformation rule stored in the computer memory is a rule which forms a non-fixed language segment of the target language with translations of components of a non-fixed language segment of the source language and a relation word of the target language according to a key component mark and a relation mark or relation word of the non-fixed language segment of the source language; the computer processor searches a list of non-fixed language segment transformation rules for a matching non-fixed language segment transformation rule and transforms a first non-fixed language segment of the non-fixed language segments of the source language into a first non-fixed language segment of the non-fixed language segments of the target language according to the matching non-fixed language segment transformation rule, repeating the step recursively until all the non-fixed language segments are transformed level by level, in which process, concerning the current non-fixed language segment of the source language, first, all the components of the current non-fixed language segment are transformed into the target language respectively, and then, the current non-fixed language segment is transformed into the target language according to the matching non-fixed language segment transformation rule, the result of the transformation of the current non-fixed language segment being returned to be used by the non-fixed language segment at the higher level, until the non-fixed language segment as the initial data is transformed into the target language.

8. A system of machine translation comprising: a computer processor for formalizing a non-formal source language and a module for transforming a formal source language into a target language which is connected to the computer processor for formalizing the non-formal source language before it; wherein the non-formal source language is formalized in an interactive way or an automatic way; the module for transforming the formal source language into the target language has two target languages comprising a formal target language and a non-formal target language; in the computer processor, a process of formalizing the non-formal source language performed by the computer processor is first identifying one by one fixed language segments of an initial language segment of the non-formal source language and tagging the fixed language segments with meaning marks until the last fixed language segment and then composing level by level the non-fixed language segments of the initial language segment and tagging the non-fixed language segments with key component marks and relation marks until the non-fixed language segment constituted by the whole initial language segment; in the module for transforming the formal source language into the target language, a process of transforming the formal source language into the formal target language performed by the computer processor is transforming in the automatic way the fixed language segments of the source language into language segments of the target language according to fixed language segment transformation rules stored in a computer memory; in the module for transforming the formal source language into the target language, a process of transforming the formal source language into the non-formal target language performed by the computer processor is first transforming in the automatic way the fixed language segments of the source language into language segments of the target language according to fixed language segment transformation rules stored in the computer memory and then transforming level by level in the automatic way the non-fixed language segments of the source language into language segments of the target language according to non-fixed language segment transformation rules stored in the computer memory.

9. The system of machine translation according to claim 8, wherein: the system includes a substitution module which is connected to the computer processor, for pre-processing by means of substitution marks performed by the computer processor, which comprises separating the initial language segment into a number of sub-segments by means of substitution marks in advance, and then formalizing the sub-segments respectively.

10. The system of machine translation according to claim 8, wherein: a fixed language segment mode of the computer processor contains a fixed language segment and its meaning mark, fixed language segments of the same form and different meanings bearing meaning marks; in the process of identifying and tagging fixed language segments in the interactive way, the computer processor judges in turn whether there exists in the computer memory at least one fixed language segment beginning with the one writing unit at the forefront, whether there exists in the computer memory at least one fixed language segment beginning with the two writing units at the forefront, whether there exists in the computer memory at least one fixed language segment beginning with the three writing units at the forefront, and so on; wherein n is a natural number, if there exists in the computer memory at least one fixed language segment beginning with the n writing unit or units at the forefront and there does not exist in the computer memory at least one fixed language segment beginning with the n+1 writing units at the forefront, the computer processor identifies the n writing unit or units at the forefront as a first fixed language segment of the fixed language segments and tags it with a first meaning mark of the meaning marks according to the fixed language segment mode, and after that a user confirms or revises the mark; if the computer processor finds out that there does not exist in the computer memory at least one fixed language segment beginning with the one writing unit at the forefront of a remaining language segment, the user identifies the fixed language segment beginning with the one writing unit at the forefront of the remaining language segment and tags it with the first meaning mark; the process is repeated until the last fixed language segment.

11. The system of machine translation according to claim 8, wherein: a fixed language segment mode of the computer processor contains a fixed language segment and its meaning mark; fixed language segments of the same form and different meanings bearing meaning marks, and contains a grammatical attribute mark and a semantic attribute mark; in the process of identifying and tagging fixed language segments in the automatic way, the computer processor judges in turn whether there exists in the computer memory at least one fixed language segment beginning with the one writing unit at the forefront, whether there exists in the computer memory at least one fixed language segment beginning with the two writing units at the forefront, whether there exists in the computer memory at least one fixed language segment beginning with the three writing units at the forefront, and so on; wherein n is a natural number, if there exists in the computer memory at least one fixed language segment beginning with the n writing unit or units at the forefront and there does not exist in the computer memory at least one fixed language segment beginning with the n+1 writing units at the forefront, the computer processor identifies the n writing unit or units at the forefront as a first fixed language segment of the fixed language segments, and then finds all the fixed language segment modes which can be used in the computer memory, chooses one of the fixed language segment modes in the choice order that a mode with a larger total number of use is prior to a mode with a smaller total number of use, and tags the fixed language segment with a first meaning mark of the meaning marks, a grammatical attribute mark and a semantic attribute mark according to the fixed language segment mode; if the computer processor finds out that there does not exist in the computer memory at least one fixed language segment beginning with the one writing unit at the forefront of a remaining language segment, the computer processor performs backtracking; the process is repeated until the last fixed language segment.

12. The system of machine translation according to claim 8, wherein: a non-fixed language segment mode of the computer processor contains grammatical attribute marks and semantic attribute marks of component segments and contains a combination mark, a key component mark, a relation mark, a grammatical attribute mark and a semantic attribute mark of a composed segment; in the process of composing and tagging non-fixed language segments in the automatic way, the computer processor finds all the non-fixed language segment modes which can be used in the computer memory, chooses one of the non-fixed language segment modes in the choice order that a mode with a larger total number of use is prior to a mode with a smaller total number of use, composes a non-fixed language segment and tags it with a key component mark, a relation mark, a grammatical attribute mark and a semantic attribute mark according to the non-fixed language segment mode; if the computer processor finds out that there does not exist at least one non-fixed language segment mode which can be used in the computer memory, the computer processor performs backtracking; the process is repeated until the non-fixed language segment constituted by the whole initial language segment.

13. The system of machine translation according to claim 8, wherein: after a user clicks on a meaning mark, a screen displays a meaning represented by the meaning mark, and, after the user clicks on a relation mark, a screen displays a relation represented by the relation mark.

14. The system of machine translation according to claim 8, wherein: the non-fixed language segment transformation rule of the module for transforming the formal source language into the target language stored in the computer memory is a rule which forms a non-fixed language segment of the target language with translations of components of the non-fixed language segment of the source language and a relation word of the target language according to a-one of said key component marks and a-one of said relation marks or relation word of the non-fixed language segment of the source language; the computer processor searches a list of non-fixed language segment transformation rules for a matching non-fixed language segment transformation rule, transforms the non-fixed language segment of the source language into the non-fixed language segment of the target language according to the matching non-fixed language segment transformation rule, repeating the step recursively until all the non-fixed language segments are transformed level by level, in which process, concerning a current non-fixed language segment of the source language, first, all the components of the current non-fixed language segment are transformed into the target language respectively, and then, the current non-fixed language segment is transformed into the target language according to the matching non-fixed language segment transformation rule, the result of the transformation of the current non-fixed language segment being returned to be used by the non-fixed language segment at the higher level, until the non-fixed language segment as the initial data is transformed into the target language.

* * * * *